United States Patent [19]
Saitoh et al.

[11] Patent Number: 5,965,238
[45] Date of Patent: Oct. 12, 1999

[54] SYNTHETIC RESIN PANEL WELDING METHOD AND HOLLOW PANEL STRUCTURES FABRICATED BY THE METHOD

[75] Inventors: Tsuyoshi Saitoh, Urawa; Kenjiro Hagiwara, Higashi-Yamato; Hisashi Sasaki, Kawaguchi, all of Japan

[73] Assignees: Kishimoto Sangyo Co., Ltd., Osaka; Unitek Co., Ltd., Saitama-ken, both of Japan

[21] Appl. No.: 08/849,673

[22] PCT Filed: Nov. 12, 1996

[86] PCT No.: PCT/JP96/03318

§ 371 Date: Jun. 16, 1997

§ 102(e) Date: Jun. 16, 1997

[87] PCT Pub. No.: WO97/18079

PCT Pub. Date: May 22, 1997

[30] Foreign Application Priority Data

Nov. 14, 1995 [JP] Japan .................................. 6-319488
Nov. 27, 1995 [JP] Japan .................................. 6-331012
Dec. 21, 1995 [JP] Japan .................................. 6-349698

[51] Int. Cl.$^6$ ........................................................ B32B 1/00
[52] U.S. Cl. ............................. 428/178; 428/34; 428/58; 428/120; 428/167; 428/188; 264/407; 264/442
[58] Field of Search .......................... 428/34, 167, 172, 428/120, 178, 188, 58, 170; 264/407, 442

[56] References Cited

U.S. PATENT DOCUMENTS 4,399,641 8/1983 Schloemer et al. ...................... 428/178
5,270,092 12/1993 Griffith et al. ............................ 428/69

FOREIGN PATENT DOCUMENTS 52-101194 8/1977 Japan .
59-7014  1/1984 Japan .
59-71817 4/1984 Japan .
7100934  4/1995 Japan .

OTHER PUBLICATIONS

Patent Abstract of Japan, vol. 14, No. 319, M–996, Abstract of JP, A, 2–106613 (Hitachi Zosen Corp), Apr. 18, 1990.

*Primary Examiner*—Donald Loney
*Attorney, Agent, or Firm*—Ladas & Parry

[57] ABSTRACT

Portions of a thermoplastic synthetic resin panel (B) formed by extrusion and integrally having a first sheet (2a), a second sheet (2b) parallel to the first sheet (2a), and a plurality of ribs (3) integrally joining the first and second sheets (2a, 2b) are welded together by ultrasonic welding by applying an ultrasonic welding head (6) and a work support block (7) of an ultrasonic welding machine to the first sheet (2a) and the second sheet (2b), respectively, and compressing the portions of the thermoplastic synthetic resin panel (B) between the ultrasonic welding head (6) and the work support block (7). When welding together two thermoplastic synthetic resin panels (B1, B2), at least portions of the panels (B1, B2) are put one on top of the other to form an overlapping section, an head (6C) and a work support block (7C) are applied to the opposite surfaces of the overlapping section, respectively, and the head (6C) is driven to generate ultrasonic waves, compressing the overlapping section between the ultrasonic welding head (6C) and the work support block (7C). The overlapping section vibrates, generates frictional heat therein, and is welded under compression.

19 Claims, 16 Drawing Sheets

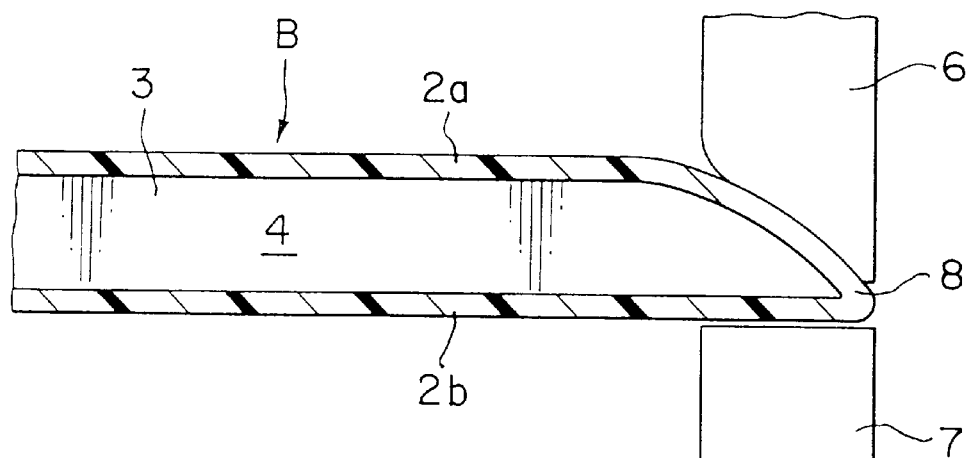
F I G. 4
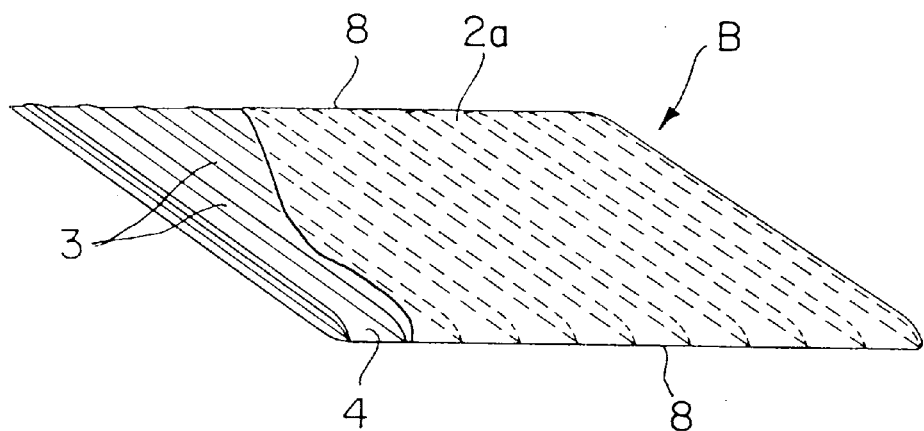
F I G. 5
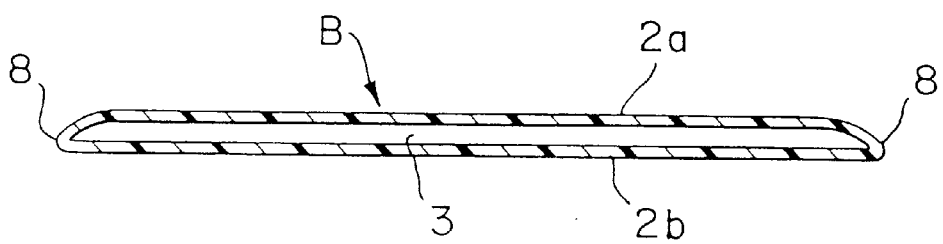
F I G. 6

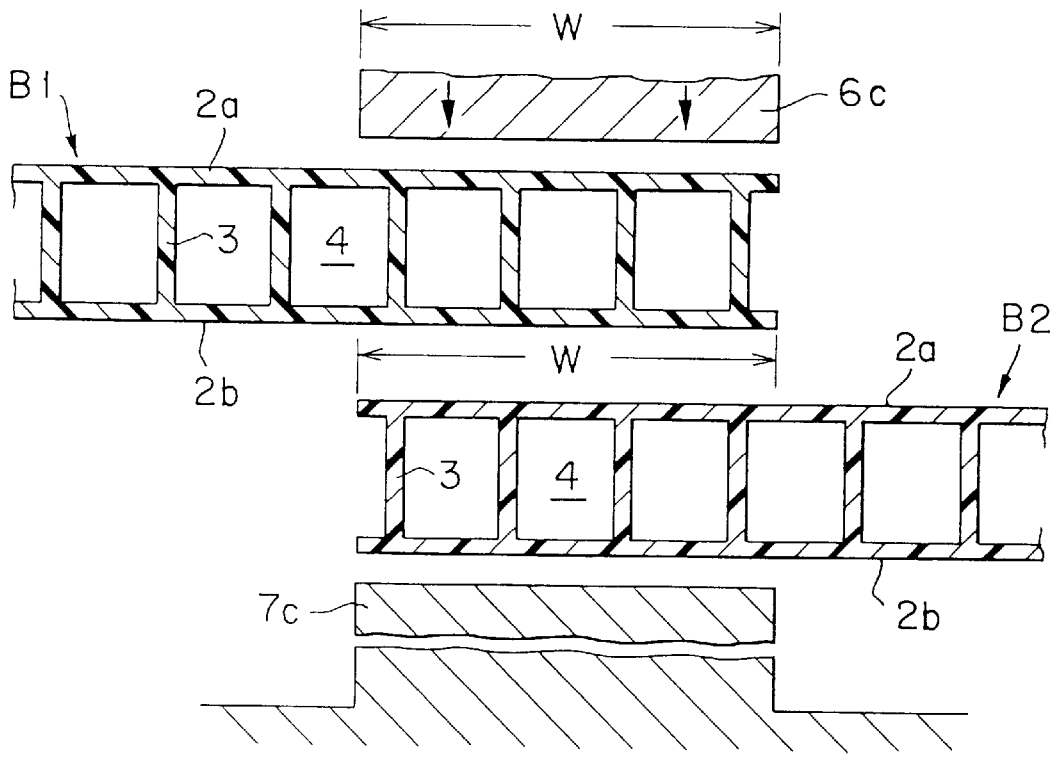
F I G. 15
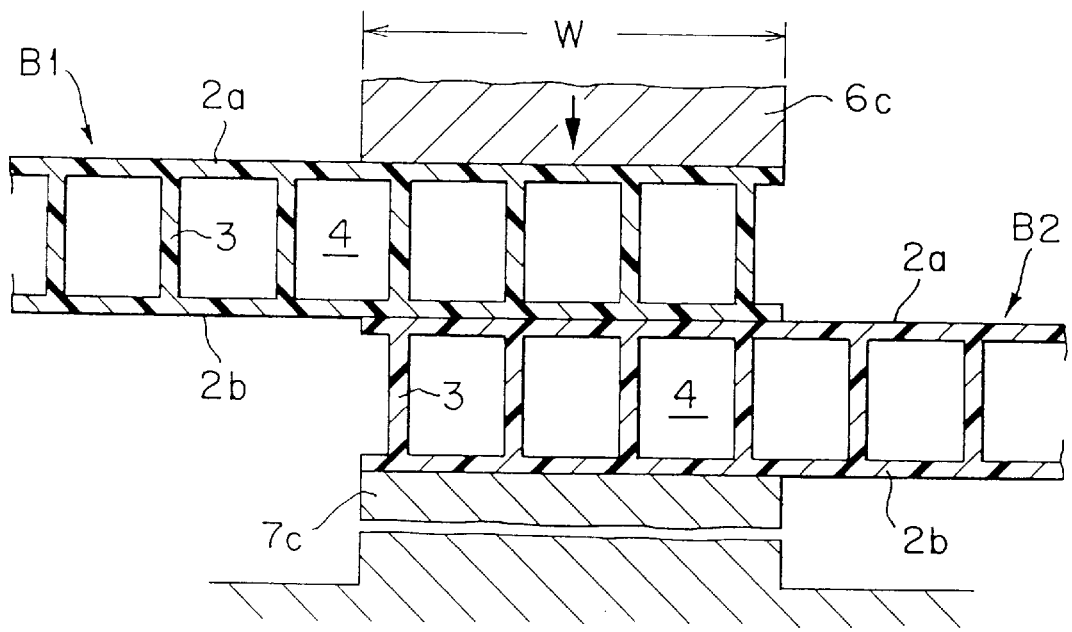
F I G. 16

SYNTHETIC RESIN PANEL WELDING METHOD AND HOLLOW PANEL STRUCTURES FABRICATED BY THE METHOD

TECHNICAL FIELD

The present invention relates to a method of welding together hollow thermoplastic synthetic resin panels each formed by integrally joining together two parallel sheets by a plurality of ribs, and a hollow panel structure fabricated by the same method.

BACKGROUND ART

Hollow thermoplastic synthetic resin panels having two parallel sheets and a plurality of ribs integrally connecting together the two sheets are used for forming packages, such as boxes, architectural materials, such as partition members and walls, and the like. The hollow thermoplastic synthetic resin panel for such purposes are produced by extruding a material in the direction of extension of the ribs. Generally, the material is a thermoplastic resin such as a polypropylene rein or a polyethylene resin. The hollow thermoplastic synthetic resin panel has become prevalently used owing to its excellent strength and durability as compared with those of corrugated cardboards, Since the side edges parallel to the ribs of the conventional hollow panel of this kind, and the end edges of the same hollow panel perpendicular to the ribs are open to the outside, the interior of the spaces of the hollow panel are liable to be contaminated with foreign matters including dust and unwanted bacteria, and the cleaning of the interiors of the hollows is practically impossible. Accordingly, the conventional hollow panel could not have been used for forming boxes for containing food, medical and pharmaceutical products, cosmetics, etc. which must meet severe sanitary standards.

When using hollow panels of this kind as a packaging material, the hollow panels need to be subjected to processes to form grooves and/or recesses in the surface thereof, and to form folding grooves and openings in the hollow panels. Such processes use press working including hot-plate press working. However, since folding grooves formed by press working are shallow and portions of the hollow panels corresponding to the folding grooves are excessively resilient, various troubles arises during and after assembling the hollow panels to form boxes. If an opening is formed in the hollow panel by press working, the interior of the hollows are opened on the edge of the opening and hence the interior of the hollows are contaminated with foreign matters including dust. When a hot plate is used for press working, the surface of the hot plate melts portions on the opposite sides of a pressed part of the opposite sheets of the hollow panel and many pores are formed in the hollow panel.

Hollow panels are joined together or a hollow panel is joined to another part, such as a frame, by methods respectively using staples, rivets, an adhesive tape and an adhesive. These methods have been employed in joining together corrugated cardboards made of paper and, in some cases, these methods are applicable to joining together hollow synthetic resin panels without entailing any problem.

Hollow thermoplastic synthetic resin panels are used for forming a package for containing a heavy article that applies a large load that cannot be born by a corrugated cardboard or fiberboard to the package or a highly air-tight or liquid-tight package. Therefore, a package formed by welding together hollow thermoplastic synthetic resin panels with adhesive tapes or an adhesive is not perfectly reliable when used for such purposes. Stapling and riveting have difficulty in carrying out air-tight or liquid-tight welding.

A method of welding together hollow thermoplastic synthetic resin panels with a hot plate, similarly to the method of forming grooves and/or recesses in hollow thermoplastic synthetic resin panels and forming folding grooves and openings in the hollow thermoplastic synthetic resin panel, has problems in that many holes and impressions are formed in the surface of the hollow thermoplastic synthetic resin panel, and in that two hollow thermoplastic synthetic resin panels, or a hollow thermoplastic synthetic resin panel and a thermoplastic synthetic resin part are not welded firmly together with satisfactory appearance and, in a worst case, the welded portions of the hollow thermoplastic synthetic resin panel are burnt off.

The present invention has been made to solve those problems in the prior art and it is therefore an object of the present invention to provide a hollow thermoplastic synthetic resin panel welding method capable of firmly welding together the opposite sheets of a hollow thermoplastic synthetic resin panel, two hollow thermoplastic synthetic resin panels or a hollow thermoplastic synthetic resin panel and another part with satisfactory appearance.

Another object of the present invention is to provide a thermoplastic synthetic resin panel welding method capable of surely closing the edges or the line of a hollow thermoplastic synthetic resin panel by fusion to seal the interior of the hollow thermoplastic synthetic resin panel.

Still another object of the present invention is to provide a thermoplastic synthetic resin panel welding method capable of surely forming grooves, recesses, folding grooves, openings and such in a hollow thermoplastic synthetic resin panel without inducing resilience in portions of the hollow thermoplastic synthetic resin panel corresponding to the grooves, the recesses, the folding grooves, the openings and such.

A further object of the present invention is to provide a hollow thermoplastic synthetic resin panel processed by the foregoing method and a hollow panel structure fabricated by processing hollow thermoplastic synthetic resin panels by the foregoing method.

DISCLOSURE OF THE INVENTION

According to an aspect of the present invention, a thermoplastic synthetic resin panel welding method comprises the steps of preparing a hollow thermoplastic synthetic resin panel having a first sheet, a second sheet parallel to the first sheet, and ribs integrally joining the first and second sheets; placing an ultrasonic welding machine with an ultrasonic welding head thereof and a work support means thereof disposed adjacent the first and second sheets, respectively; moving the ultrasonic welding head and the work support means toward each other to bring the ultrasonic welding head and the work support means into contact with the first and second sheets, respectively; generating ultrasonic waves between the ultrasonic welding head and the work support means to generate frictional heat by the ultrasonic vibration of the first and second sheets; and compressing the first and second sheets between the ultrasonic welding head and the work support means to weld together the first and second sheets.

According to another aspect of the present invention, a thermoplastic synthetic resin panel welding method comprises the steps of preparing a first hollow thermoplastic synthetic resin panel consisting of a first sheet, a second sheet parallel to the first sheet, and ribs defining a plurality of spaces between the first and second sheets, and a second hollow thermoplastic synthetic resin panel of the same construction as that of the first hollow thermoplastic synthetic resin panel; placing the first and second hollow thermoplastic synthetic resin panels one on top of the other; placing an ultrasonic welding machine with an ultrasonic welding head thereof disposed on a surface of the first hollow thermoplastic synthetic resin panel and a work support means thereof disposed on a surface of the second hollow thermoplastic synthetic resin panel opposite to each other with respect to a line; moving the ultrasonic welding head and the work support means toward each other to bring the first and second hollow thermoplastic synthetic resin panels into contact with each other; driving the ultrasonic welding head to generate frictional heat by ultrasonic vibration in the first and second hollow thermoplastic synthetic resin panels so that portions of the first and second hollow thermoplastic synthetic resin panels along the line are fused and welded together.

According to another aspect of the present invention, a method of welding together a hollow thermoplastic synthetic resin panel and a thermoplastic synthetic resin part comprises the steps of preparing a hollow thermoplastic synthetic resin panel consisting of a first sheet, a second sheet parallel to the first sheet, and ribs defining a plurality of spaces between the first and second sheets, and a thermoplastic synthetic resin member; putting the hollow thermoplastic synthetic resin panel and the member one on top of the other; placing an ultrasonic welding machine with an ultrasonic welding head thereof disposed on a surface of the hollow thermoplastic synthetic resin panel and a work support means of the ultrasonic welding machine disposed on a surface of the member so that the hollow thermoplastic synthetic resin panel and the member are held between the ultrasonic welding head and the work support means; driving the ultrasonic welding head to generate frictional heat in portions of the hollow thermoplastic synthetic resin panel and the member in contact with each other by ultrasonic vibration so that the hollow thermoplastic synthetic resin panel and the member are welded together.

According to still another aspect of the present invention, a thermoplastic synthetic resin panel welding method comprises the steps of preparing a first hollow thermoplastic synthetic resin panel consisting of a first sheet, a second sheet parallel to the first sheet, and ribs defining a plurality of spaces between the first and second sheets, and a second hollow thermoplastic synthetic resin panel of the same construction as that of the first hollow thermoplastic synthetic resin panel; placing the first and second hollow thermoplastic synthetic resin panels so that end portions thereof overlap each other to form an overlapping section; placing an ultrasonic welding machine with an ultrasonic welding head thereof disposed on one side of the overlapping section and with a work support means thereof disposed on the other side of the same; driving the ultrasonic welding head to generate frictional heat by ultrasonic vibration in the surfaces of the overlapping end portions of the first and second hollow thermoplastic synthetic resin panels in contact with each other so that the surfaces of the overlapping end portions of the first and second hollow thermoplastic synthetic resin panels in contact with each other are softened and welded together; and compressing the first and second sheets of the overlapping portions of the first and second hollow thermoplastic synthetic resin panels in the direction of their thickness by the ultrasonic welding head and the work support means to weld together the first and second hollow thermoplastic synthetic resin panels.

According to a further aspect of the present invention, a thermoplastic synthetic resin panel welding method comprises the steps of preparing a hollow thermoplastic synthetic resin panel consisting of a first sheet, a second sheet parallel to the first sheet, and ribs defining a plurality of spaces between the first and second sheets; placing opposite edge portions of the hollow thermoplastic synthetic resin panel one on top of the other to form an overlapping section; placing an ultrasonic welding machine with an ultrasonic welding head thereof disposed on one side of the overlapping section and with a work support means thereof disposed on the other side of the overlapping section; driving the ultrasonic welding head to generate ultrasonic waves that propagate from the ultrasonic welding head toward the work support means so that frictional heat is generated in the surfaces of the overlapping edge portions by ultrasonic vibration and the surfaces of the overlapping edge edge portions are softened and welded together; and compressing the overlapping edge portions of the hollow thermoplastic synthetic resin panel between the ultrasonic welding head and the work support means in the direction of the thickness of the overlapping edge portions to reduce the thickness of the overlapping section to a thickness substantially equal to the thickness of the hollow thermoplastic synthetic resin panel.

According to a still further aspect of the present invention, a thermoplastic synthetic resin panel welding method comprises the steps of preparing a hollow thermoplastic synthetic resin panel consisting of a first sheet, a second sheet parallel to the first sheet, and ribs defining a plurality of spaces between the first and second sheets; folding an end portion of the hollow thermoplastic synthetic resin panel in layers; holding the layers of the hollow thermoplastic synthetic resin panel between an ultrasonic welding head and work support means of an ultrasonic welding machine; driving the ultrasonic welding head to generate frictional heat in the layers of the hollow thermoplastic synthetic resin panel by ultrasonic vibration so that the layers of the hollow thermoplastic synthetic resin panel are welded together to form an edge portion of a thickness greater than that of the hollow thermoplastic synthetic resin panel.

According to another aspect of the present invention, a thermoplastic synthetic resin panel welding method comprises the steps of preparing a first hollow thermoplastic synthetic resin panel consisting of a first sheet, a second sheet parallel to the first sheet, and ribs integrally joined to the first and second sheets and defining a plurality of spaces between the first and second sheets, and a second hollow thermoplastic synthetic resin panel of the same construction as that of the first hollow thermoplastic synthetic resin panel; disposing the first and second hollow thermoplastic synthetic resin panels with side edges thereof pressed against each other to form a butting section; placing an ultrasonic welding machine with an ultrasonic welding head thereof and a work support means thereof disposed opposite to each other with respect to the direction of thickness of the butting section on the opposite sides of the butting section, respectively; driving the ultrasonic welding head to generate frictional heat in the end surfaces of the hollow thermoplastic synthetic resin panels butting on each other by ultrasonic vibration so that the end surfaces of the hollow thermoplastic synthetic resin panels butting each other are fused and welded together to connect the first and second hollow thermoplastic synthetic resin panels together in a single hollow thermoplastic synthetic resin panel.

According to still another aspect of the present invention, a thermoplastic synthetic resin panel welding method comprises the steps of preparing first, second and third hollow thermoplastic synthetic resin panels of the same construction each consisting of a first sheet, a second sheet parallel to the first sheet and ribs integrally joining the first and second sheets and defining a plurality of spaces between the first and second sheets; placing the first and second hollow thermoplastic synthetic resin panels to form an edge-to-edge junction; placing the third hollow thermoplastic synthetic resin panel at an angle to the surfaces of the first and second hollow thermoplastic synthetic resin panels so that a side edge of the third panel butts on the edge-to-edge junction of the first and second hollow thermoplastic synthetic resin panels; placing an ultrasonic welding machine with an ultrasonic welding head thereof in contact with the edge-to-edge junction of the first and second hollow thermoplastic synthetic resin panels on a side opposite the side on which the third hollow thermoplastic synthetic resin panel butts on the edge-to-edge junction of the first and second hollow thermoplastic synthetic resin panels, and with a work support means of the ultrasonic welding machine in contact with portions of the first, second and third hollow thermoplastic synthetic resin panels in the edge-to-edge junction of the first, second and third hollow thermoplastic synthetic resin panels; driving the ultrasonic welding head to generate frictional heat in portions of the first, second and third hollow thermoplastic synthetic resin panels in the junction of the first, second and third hollow thermoplastic synthetic resin panels so that portions of the first, second and third hollow thermoplastic synthetic resin panels in the junction are fused and welded together.

According to a further aspect of the present invention, a thermoplastic synthetic resin panel welding method comprises the steps of preparing first and second hollow thermoplastic synthetic resin panels of the same construction each consisting of a first sheet, a second sheet parallel to the first sheet, and ribs integrally joining the first and second sheets and defining a plurality of spaces between the first and second sheets; placing the second hollow thermoplastic synthetic resin panel at an angle to one surface of the first hollow thermoplastic synthetic resin panel with a side edge of the second panel butting on the surface of the first hollow thermoplastic synthetic resin panel; placing an ultrasonic welding machine with an ultrasonic welding head thereof in contact with a portion of the other surface of the first hollow thermoplastic synthetic resin panel corresponding to the junction of the first and second hollow thermoplastic synthetic resin panels, and with a work support means of the ultrasonic welding machine in contact with portions of the surface of the first hollow thermoplastic synthetic resin panel on the opposite sides of the second hollow thermoplastic synthetic resin panel and with portions of the opposite surfaces of the second hollow thermoplastic synthetic resin panel; driving the ultrasonic welding head to generate frictional heat in portions of the first and second hollow thermoplastic synthetic resin panels corresponding to the junction so that those positions are fused and welded together.

According to a still further aspect of the present invention, a method of welding together a hollow thermoplastic synthetic resin panel consisting of a first sheet, a second sheet parallel to the first sheet, and ribs integrally joining the first and second sheets and defining a plurality of spaces between the first and second sheets, and a thermoplastic resin member, comprises the steps of preparing the hollow thermoplastic synthetic resin panel and the thermoplastic synthetic resin member; placing the hollow thermoplastic synthetic resin panel with a side edge thereof butting on the thermoplastic synthetic resin member; placing an ultrasonic welding machine with an ultrasonic welding head thereof in contact with a portion of one surface of the hollow thermoplastic synthetic resin panel adjacent the joint of the hollow thermoplastic synthetic resin panel and the thermoplastic synthetic resin member and a work support means of the ultrasonic welding machine in contact with a portion of the other surface of the hollow thermoplastic synthetic resin panel adjacent the joint of the hollow thermoplastic synthetic resin panel and the thermoplastic synthetic resin member; driving the ultrasonic welding head to generate frictional heat in portions of the hollow thermoplastic synthetic resin panel and the thermoplastic synthetic resin member around the joint so that those portions are fused and welded together.

According to an aspect of the present invention, a hollow panel structure comprises first and second hollow thermoplastic synthetic resin panels of the same construction each consisting of a first sheet, a second sheet parallel to the first sheet, and a plurality of ribs integrally joining the first and second sheets and defining a plurality of spaces between the first and second sheets, wherein the first and second hollow thermoplastic synthetic resin panels are disposed with side edge portions thereof overlapping each other to form an overlapping section, portions of the first and second hollow thermoplastic synthetic resin panels in the overlapping section are welded together by ultrasonic welding, and the thickness of the overlapping section is substantially equal to the thickness of the first and second hollow thermoplastic synthetic resin panels.

According to a further aspect of the present invention, a hollow panel structure comprises first and second hollow thermoplastic synthetic resin panels of the same construction consisting of a first sheet, a second sheet parallel to the first sheet, and a plurality of ribs integrally joining the first and second sheets and defining a plurality of spaces between the first and second sheets; wherein the first and second hollow thermoplastic synthetic resin panels are disposed with side edges thereof butting against each other, and the side edges are welded together by ultrasonic welding.

According to a still further aspect of the present invention, a hollow panel structure comprises a hollow thermoplastic synthetic resin panel consisting of a first sheet, a second sheet parallel to the first sheet, and a plurality of ribs integrally joining the first and second sheets and defining a plurality of spaces between the first and second sheets, and a thermoplastic synthetic resin member; wherein the hollow thermoplastic synthetic resin panel and the thermoplastic synthetic resin member are put in contact with each other, and portions of the hollow thermoplastic synthetic resin panel and the thermoplastic synthetic resin member in contact with each other are welded together by ultrasonic welding.

The present invention employs an ultrasonic welding process instead of a heat bonding process which applies heat to portions of components to be welded together. An ultrasonic welding process employed in the present invention makes the material forming the hollow thermoplastic synthetic resin panel vibrate to generate heat in the hollow thermoplastic synthetic resin panel instead of applying heat to the hollow thermoplastic synthetic resin panel. Frictional heat is easily generated in portions of the sheets of hollow thermoplastic synthetic resin panels pressed against each other and hence those portions are easily fused. Accordingly, welding starts from the interior of those portions and the external surfaces of the sheets are hardly affected by welding and are kept clean. Since the internal portions of the components of the hollow thermoplastic synthetic resin panel are welded, the junctions has a high weld strength. Since the range of welding can easily be controlled, the components can be welded together accurately, for example, along a line. Ultrasonic waves can effectively propagate through the ribs of the hollow thermoplastic synthetic resin panel, and the sheets of the hollow thermoplastic synthetic resin panels can effectively be welded together owing to the agency of the ribs.

The heat bonding process heats portions of components to be welded together by applying heat to those positions from the outside. Therefore, the surfaces of the hollow thermoplastic synthetic resin panel are liable to be affected adversely by the heat, the inner portion of the components of the hollow thermoplastic synthetic resin panel are not necessarily be welded with reliability, portions of the components around the welded portions are liable to be affected by heat and, in most cases, it is difficult to weld the components exactly as resigned.

BRIEF DESCRIPTION OF THE DRAWINGS

FIG. 4 is a side view of the hollow thermoplastic synthetic resin panel in a final stage of the method of closing openings in an end edge of the hollow thermoplastic synthetic resin panel;

FIG. 5 is a partly cutaway perspective view of a hollow thermoplastic synthetic resin panel having end edges closed as shown in FIG. 4;

FIG. 6 is a sectional view of the hollow thermoplastic synthetic resin panel of FIG. 4;

FIG. 15 is sectional view of two hollow thermoplastic synthetic resin panels in an initial stage of a welding process for welding together the respective side edge portions of the hollow thermoplastic synthetic resin panels;

FIG. 16 is a sectional view of the two hollow thermoplastic synthetic resin panels in a stage subsequent to the initial stage of the welding process shown in FIG. 15;

BEST MODE FOR CARRYING OUT THE INVENTION

Preferred embodiments of the present invention will be described hereinafter with reference to the accompanying drawings.

Figure 1:
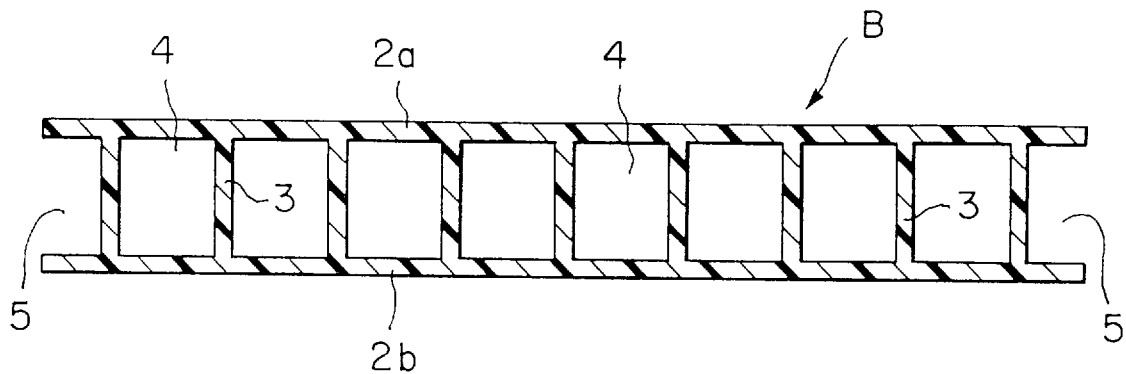
FIG. 1 is a sectional view of a hollow thermoplastic synthetic resin panel to which the present invention is applied.
Figure 2:
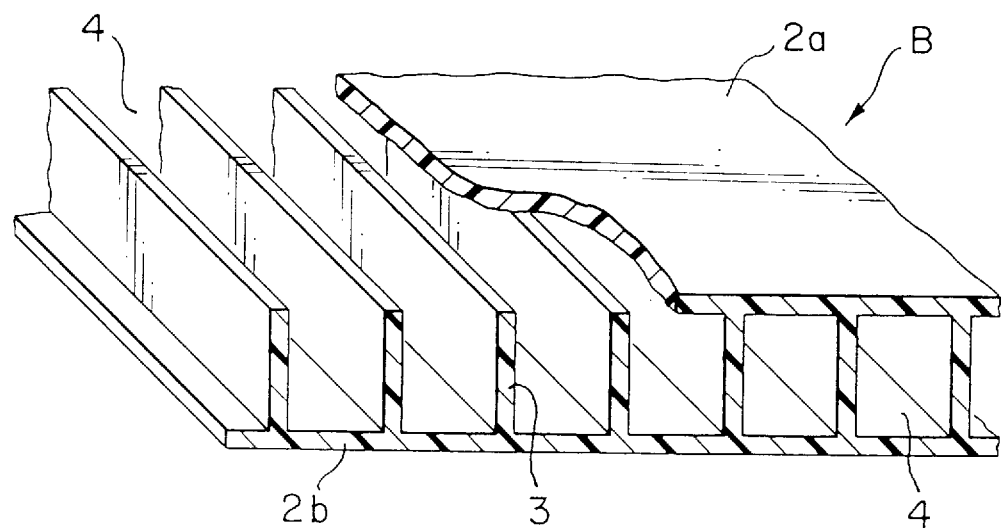
FIG. 2 is a partly cutaway perspective view of the hollow thermoplastic synthetic resin panel of FIG. 1.

Referring to FIGS. 1 and 2 showing a hollow thermoplastic synthetic resin panel B relevant to the present invention in a sectional view and a partly cutaway perspective view, respectively, the hollow thermoplastic synthetic resin panel has a first sheet 2a, a second sheet 2b extended opposite to and in parallel to the first sheet 2a, and a plurality of parallel ribs 3 integrally joining the sheets 2a and 2b. A plurality of hollow spaces 4 are formed between adjacent ribs 3. The sheets 2a and 2b and the ribs 3 are formed in an integral structure by extruding a thermoplastic resin, such as a polypropylene resin or a polyethylene resin, through an extrusion die.

In the hollow thermoplastic synthetic resin panel B thus formed, the side edges 5 parallel to the ribs 3 are open to the outside as shown in FIG. 1, and the spaces 4 are open in the longitudinal end edges as shown in FIG. 2. Therefore, the interior of the hollow thermoplastic synthetic resin panel B is liable to be contaminated with foreign matters including dust and unwanted bacteria and, once contaminated, it is practically impossible to wash the interior of the hollow thermoplastic synthetic resin panel B.

Figure 3:
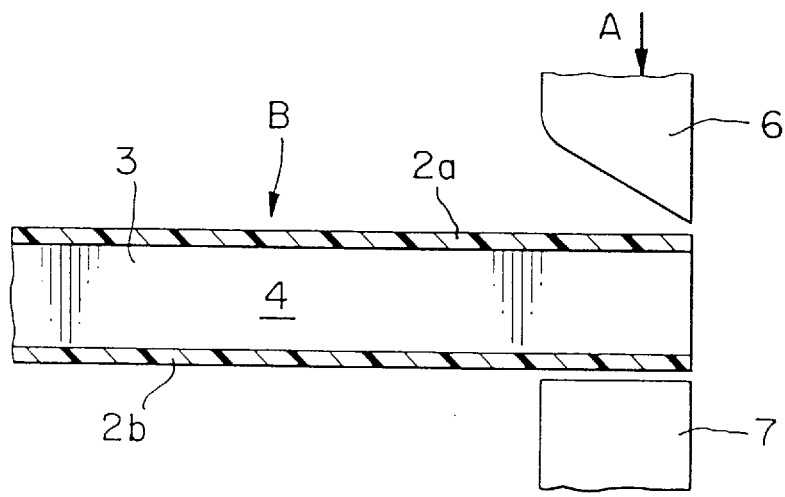
FIG. 3 is a side view of the hollow thermoplastic synthetic resin panel in an initial stage of a method of closing openings in an end edge of the hollow thermoplastic synthetic resin panel.

A thermoplastic synthetic resin panel welding method in a preferred embodiment according to the present invention solves such a problem. For example, the open ends of the spaces 4 opening in the longitudinal end edges of the hollow thermoplastic synthetic resin panel B are closed by welding together the longitudinal end portions of the first sheet 2a and the second sheet 2b as shown in FIGS. 3 and 4. The present invention employs an ultrasonic welding machine, the principle of which is generally known, for welding together the longitudinal end portions of the first sheet 2a and the second sheet 2b. The ultrasonic welding machine is provided with a transducer which uses a unidirectional piezoelectric effect for converting electric power into ultrasonic vibration, and an amplifier. Ultrasonic vibration is exerted through an ultrasonic horn on a workpiece to generate heat in the workpiece by stimulating atomic movement in molecules of the material forming the workpiece.

FIG. 3 shows an ultrasonic welding machine which carries out a thermoplastic synthetic resin panel welding method in accordance with the present invention. The ultrasonic welding machine has an ultrasonic welding head 6, i.e., an ultrasonic horn, and a work support block 7 having a flat support surface. The ultrasonic welding head 6 is extended along an end edge of the outer surface of the first sheet 2a of the hollow thermoplastic synthetic resin panel B (perpendicularly to the sheet of FIG. 3), and the work support block 7 is disposed with its support surface extended along an end edge of the outer surface of the second sheet 2b of the hollow thermoplastic synthetic resin panel B so as to correspond to the ultrasonic welding head 6. The end edge of the hollow thermoplastic synthetic resin panel B is placed on the work support block 7, the ultrasonic welding head 6 is actuated to generate ultrasonic waves, and the ultrasonic welding head 6 is moved in the direction of the arrow A (FIG. 3) toward the work support block 7 to compress the end edge portion of the hollow thermoplastic synthetic resin panel B between the ultrasonic welding head 6 and the work support block 7. The ultrasonic waves generated by the ultrasonic welding head 6 are transmitted through the first sheet 2a and the ribs 4 to the second sheet 2b. Then, heat is generated in the first sheet 2a, the second sheet 2b and the ribs 3 by intramolecular vibration and the first sheet 2a, the second sheet 2b and the ribs 3 are fused and welded together. Since those fused portions of the first sheet 2a, the second sheet 2b and the ribs 3 are compressed between the ultrasonic welding head 6 and the work support block 7, the first sheet 2a is pressed toward the second sheet 2b as the ribs 3 are softened and, finally, the end edge of the first sheet 2a is joined to the end edge of the second sheet 2b as shown in FIG. 4. The end edge portion of the first sheet 2a is bent toward the end edge portion of the second sheet 2b and the respective end edges of the first sheet 2a and the second sheet 2b are welded together. The ultrasonic welding head 6 has a concave, curved shape with the outer edge portion protruding to the largest extent as shown in FIG. 4, and the end edge portion of the first sheet 2a is bent in a curve conforming to the concave, curved shape of the ultrasonic welding head 6. The end portions of the ribs 4 are melted into a shape conforming the curved shape of the end edge portion of the first sheet 2a. Since the ultrasonic waves are effective only in a region between the ultrasonic welding head 6 and the work support block 7, only portions of the hollow thermoplastic synthetic resin panel B in this region are melted and the rest of the same are not melted.

The other end edge of the hollow thermoplastic synthetic resin panel B is closed also by welding to form closed end edges or seams 8 in the hollow thermoplastic synthetic resin panel B as shown in FIGS. 5 and 6. The closed end seams 8 can be formed in a desired shape by properly determining the shapes of the ultrasonic welding head 6 and the work support block 7.

When the end seams 8 are thus formed, the space 4 of the hollow thermoplastic synthetic resin panel B are not contaminated with foreign matters including dust, and air is sealed in the spaces 4. Consequently, the heat insulating performance and the rigidity of the hollow thermoplastic synthetic resin panel B are enhanced. If necessary, the side edges of the hollow thermoplastic synthetic resin panel B parallel to the ribs 3 may be closed by welding.

Welding work similar to that mentioned above can be practiced for portions of the hollow thermoplastic synthetic resin panel B other than the edge portions. When forming a hollow panel structure shown in FIG. 7, an ultrasonic welding head 6A is formed in a tapered cross section and has a middle nose 9. and a work support block 7A is basically the same as the foregoing work support block 7 and has a flat support surface. A desired portion of the hollow thermoplastic synthetic resin panel B is placed on the work support block 7A, the ultrasonic welding head 6A is driven to generate ultrasonic waves and the ultrasonic welding head 6A is moved toward the work support block 7A. Consequently, the desired portion of the hollow thermoplastic synthetic resin panel B is softened and partly melted and the first sheet 2a is curved and welded to the second sheet 2b to form a linear grove 10 having a substantially V-shaped cross section as indicated by alternate long and two short dashes lines in FIG. 7.

Thus, a weld line 11 is formed in the bottom of the V-shaped linear groove 10 in the hollow thermoplastic synthetic resin panel B. The shape of the linear groove 10 is dependent on the shape of the ultrasonic welding head 6A.

A member may be attached to the panel B by fitting the member in the linear groove 10 or the groove 10 may be formed in characters, patterns or marks.

Figure 8:
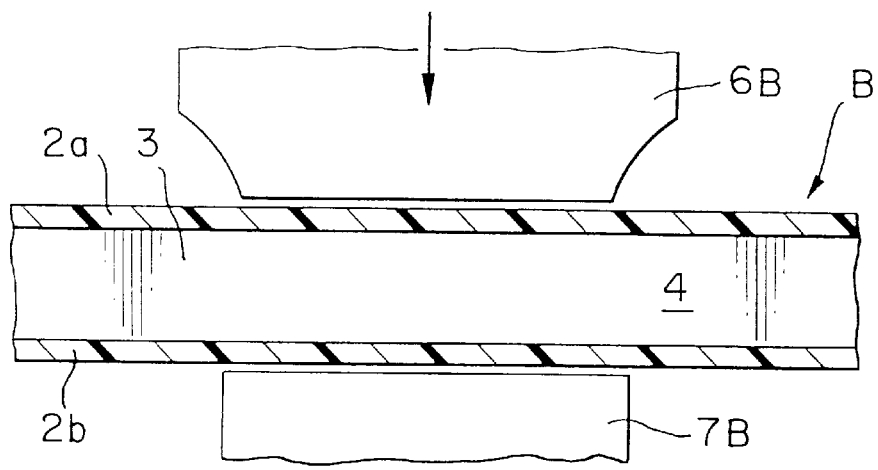
FIG. 8 is a sectional view of a hollow thermoplastic synthetic resin panel, explaining a method of two-dimensionally welding together portions of the first and the second sheets of the hollow thermoplastic synthetic resin panel.
Figure 9:
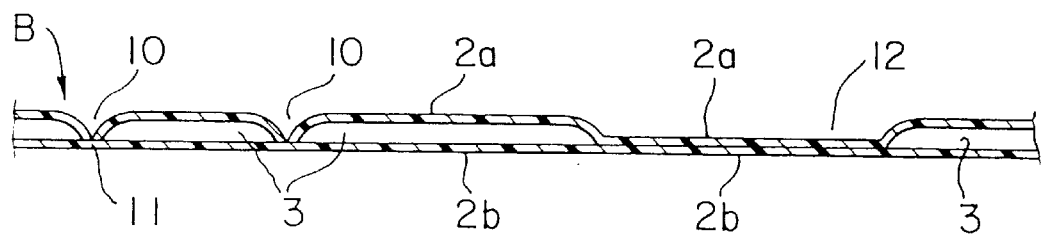
FIG. 9 is sectional view of a hollow thermoplastic synthetic resin panel having welded portions formed by the methods illustrated in FIGS. 7 and 8.

A thermoplastic synthetic resin panel welding method shown in FIG. 8 forms a recess 12 having a flat bottom surface instead of the linear groove 10. An ultrasonic welding head 6B having a flat end surfaces and a work support block 7B having a flat support surface corresponding to the flat end surface of the ultrasonic welding head 6B are employed. The ultrasonic welding head 6B is driven to generate ultrasonic waves and is moved toward the work support block 7B. Consequently, a portion of the hollow thermoplastic synthetic resin panel B corresponding to the flat end surface of the ultrasonic welding head 6B is softened, portions of the ribs 3 corresponding to the ultrasonic welding head 6B are melted, and a portion of the first sheet 2a corresponding to the ultrasonic welding head 6B is welded to the second sheet 2b to form the recess 12 as shown in FIG. 9. The recess 12 may be a gripping recess, pattern or marks.

Figure 10:
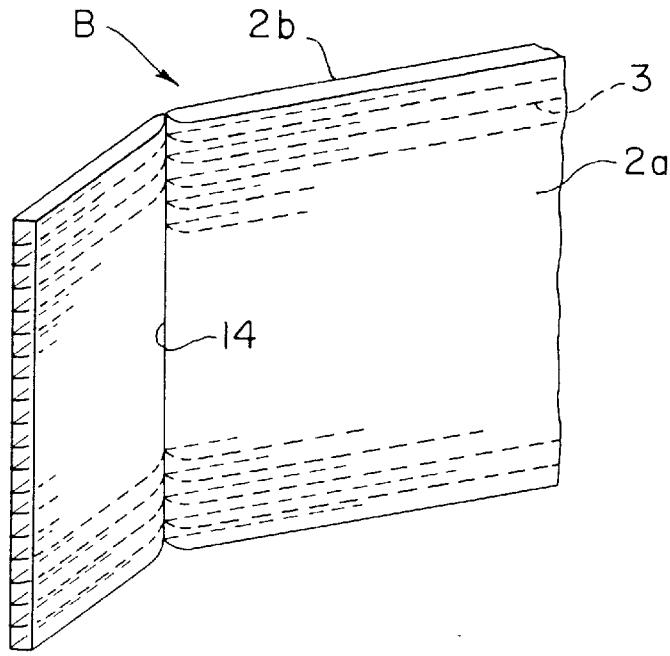
FIG. 10 is a perspective view of a hollow thermoplastic synthetic resin panel having a linearly welded portion.

FIG. 10 shows a hollow panel structure obtained by forming a folding line 14 perpendicular to ribs 3 in a hollow thermoplastic synthetic resin panel B. This folding line 14 can be formed by compressing a portion of the hollow thermoplastic synthetic resin panel B between an ultrasonic welding head similar to the ultrasonic welding head 6A shown in FIG. 7, and a work support block of a shape similar to that of the ultrasonic welding head. In this hollow panel structure, corresponding portions of the first sheet 2a and the second sheet 2b are curved in linear grooves similar to the linear groove 10 of FIG. 9 and the bottoms of the linear grooves are joined to each other to form the folding line 14. The hollow thermoplastic synthetic resin panel B can be folded along the folding line 14. The folding line 14 can be formed in parallel to or at an inclination to the ribs 3.

Figure 7:
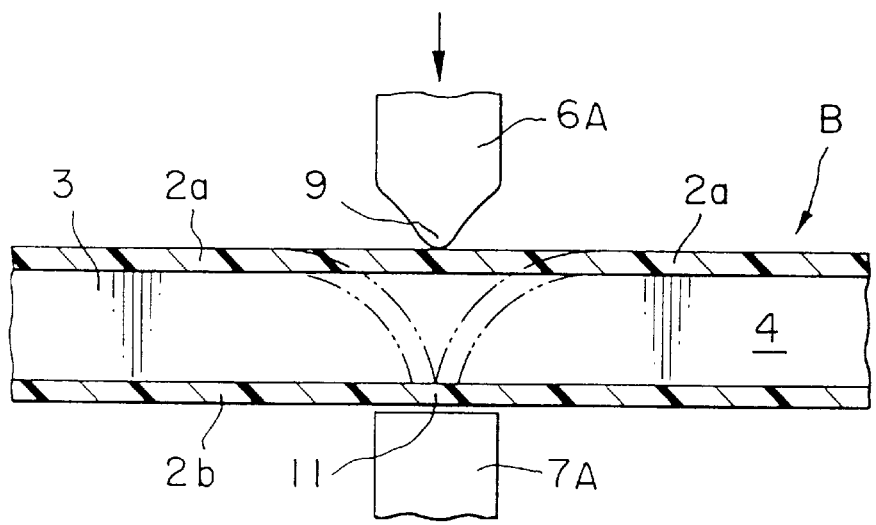
FIG. 7 is sectional view of a hollow thermoplastic synthetic resin panel, explaining a method of welding portions of the hollow thermoplastic synthetic resin panel along lines.

Since corresponding portions of the sheets 2a and 2b on the folding line 14 are directly welded together, the resilience of the hollow thermoplastic synthetic resin panel B against bending along the folding line 14 is low and, when used as a hinge, the folding line 14 has an increased fatigue strength. Although the linear groove 10 having a V-shaped cross section as shown in FIG. 7 may be used as a folding line, it is desirable that the folding line be formed by forming linear grooves having a common bottom in the opposite surfaces of the hollow thermoplastic synthetic resin panel B.

Figure 11:
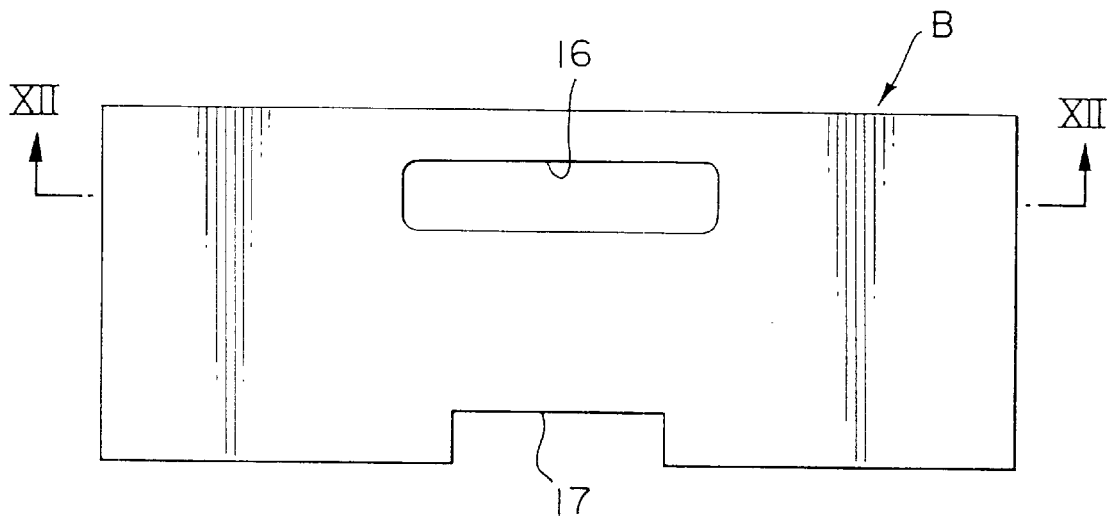
FIG. 11 is a plan view of a hollow thermoplastic synthetic resin panel provided with an opening and a recess demarcated by welded portions.
Figure 12:
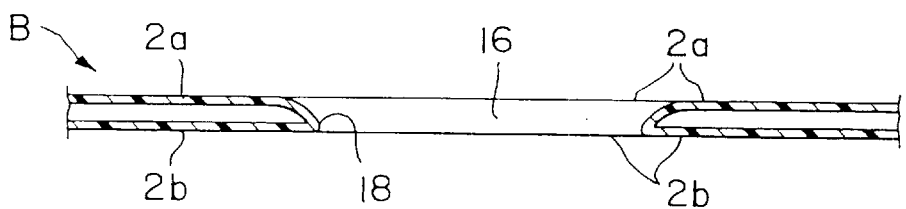
FIG. 12 is a sectional view taken on line XII—XII in FIG. 11.

The first sheet 2a and the second sheet 2b can be welded together in a manner as shown in FIGS. 11 and 12. An opening 16 or a recess 17 is formed in the hollow thermoplastic synthetic resin panel B as shown in FIG. 11, the edges of the opening 16 or the recess 17 are held between an ultrasonic welding head and a work support block having the shape of the opening 16 or the recess 17, and then ultrasonic waves are generated by the ultrasonic welding head. Consequently, portions of the sheets 2a and 2b corresponding to the edges of the opening 16 or the recess 17 are welded together. Thus, the edges 18 of the opening 16 are closed or seamed as shown in FIG. 12.

Figure 13:
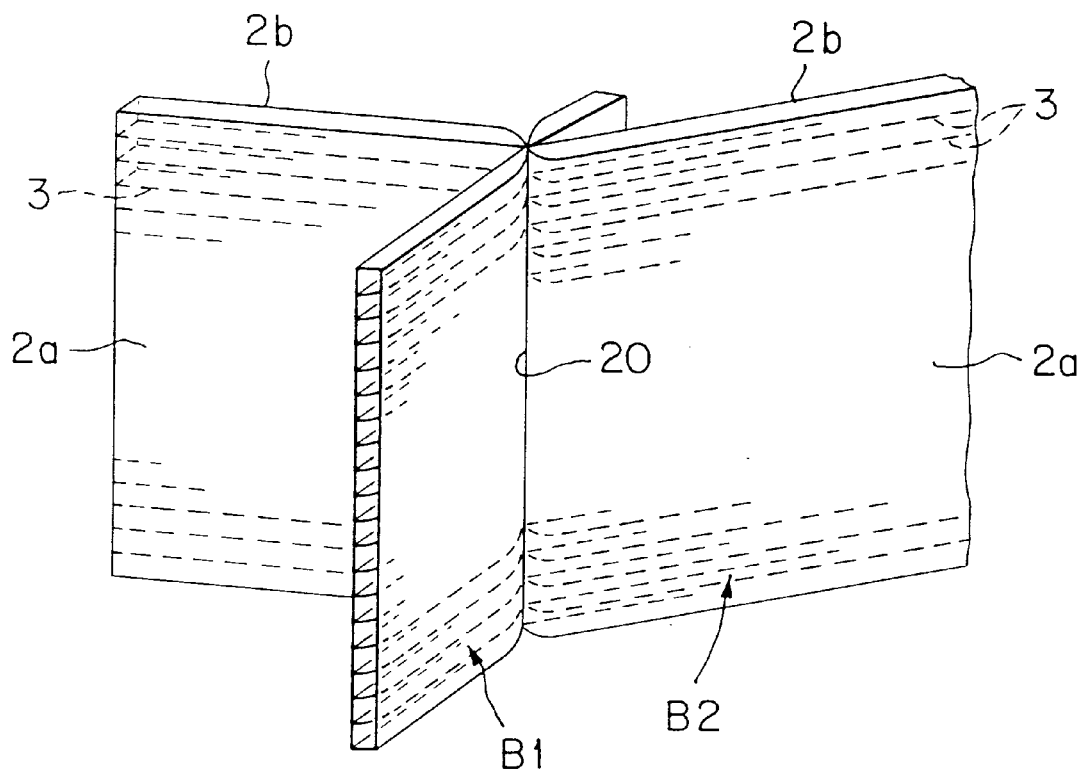
FIG. 13 is a perspective view of two hollow thermoplastic synthetic resin panels welded together along a line.

In the foregoing hollow panel structures, the sheets 2a and 2b of a hollow thermoplastic synthetic resin panel B are welded together. A hollow panel structure shown in FIG. 13 is formed by welding together a first hollow thermoplastic synthetic resin panel B1 and a second hollow thermoplastic synthetic resin panel B2 along a weld line 20. When welding together the two hollow thermoplastic synthetic resin panel B1 and B2 along the weld line 20, the two hollow thermoplastic synthetic resin panel B1 and B2 are put one on top of the other, an ultrasonic welding head is brought into contact with the first sheet 2a of the first hollow thermoplastic synthetic resin panel B1, a work support block is brought into contact with the second sheet 2b of the second hollow thermoplastic synthetic resin panel B2, the ultrasonic welding head is driven to generate ultrasonic waves and moved toward the work support block. Consequently, heat is generated in portions of the hollow thermoplastic synthetic resin panels B1 and B2 between the ultrasonic welding head and the work support block and the hollow thermoplastic synthetic resin panels B1 and B2 are welded together. The ultrasonic welding head and the work support block are formed in linear shapes to form the straight weld line 20 as shown in FIG. 13. The hollow panel structure thus formed by welding together the hollow thermoplastic synthetic resin panels B1 and B2 and having the straight weld line 20 is used as a partition member for dividing the interior of a box into separate spaces or a component member of a honeycomb structure.

Figure 14:
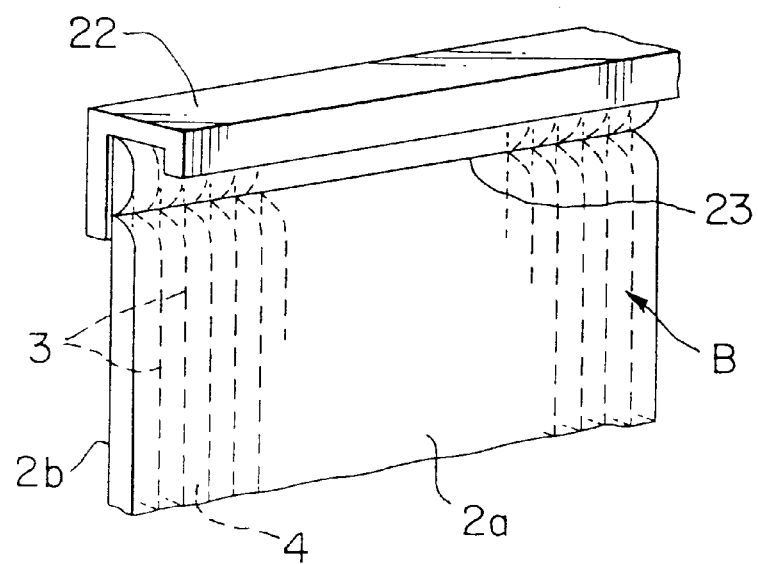
FIG. 14 is a perspective view of a hollow thermoplastic synthetic resin panel welded to a member.

FIG. 14 shows a hollow panel structures formed by combining a hollow thermoplastic synthetic resin panel B and a thermoplastic synthetic resin member 22. The hollow thermoplastic synthetic resin panel B is welded along a weld line 23 to the thermoplastic synthetic resin member 22 by ultrasonic welding as mentioned above. The thermoplastic synthetic resin member 22 is, for example, a member of a frame for reinforcing a box.

FIGS. 15 to 18 show different phases of a thermoplastic synthetic resin panel welding method for welding together side edge portions of a first hollow thermoplastic synthetic resin panel B1 and a second hollow thermoplastic synthetic resin panel B2. As shown in FIG. 15, the hollow thermoplastic synthetic resin panel B1 and B2 are disposed between an ultrasonic welding head 6C and a work support block 7C of an ultrasonic welding machine so that side edge portions of a width W of the hollow thermoplastic synthetic resin panel B1 and B2 overlap each other. Then, the ultrasonic welding head 6C is driven to generate ultrasonic waves and moved toward the work support block 7C. The ultrasonic welding head 6C and the work support block 7C have flat working surfaces having a width W equal to the width W of the overlapping portions of the hollow thermoplastic synthetic resin panels B1 and B2 and capable of being brought into close contact with the first sheet 2a of the first hollow thermoplastic synthetic resin panel B1 and the second sheet 2b of the second hollow thermoplastic synthetic resin panel B2, respectively. When the ultrasonic welding head 6C is thus moved toward the work support block 7C, the overlapping portions of the hollow thermoplastic synthetic resin panels B1 and B2 are held between the ultrasonic welding head 6C and thus work support block 7C as shown in FIG. 16.

Figure 17:
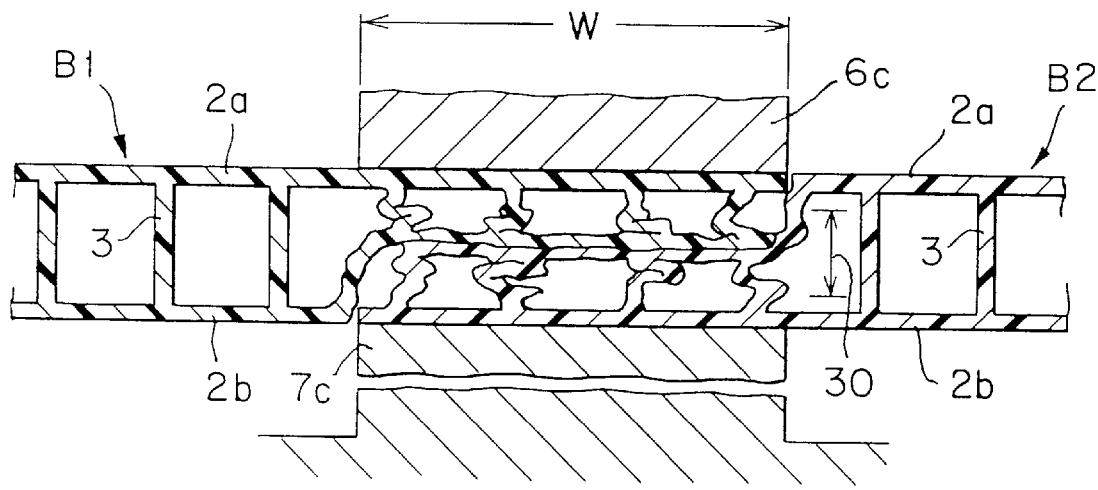
FIG. 17 is a sectional view of the two completely welded hollow thermoplastic synthetic resin panels in the final stage of the welding process subsequent to the stage shown in FIG. 16.

As the ultrasonic welding head 6C is advanced further from a position shown in FIG. 16 to a position shown in FIG. 17. ultrasonic waves generated by the ultrasonic welding head 6C are propagated through the first sheet 2a, the ribs 3 and the second sheet 2b of the hollow thermoplastic synthetic resin panel B1, and the first sheet 2a and the ribs 3 of the second hollow thermoplastic synthetic resin panel B2 to the second sheet 2b of the second hollow thermoplastic synthetic resin panel B2, so that heat is generated in the overlapping portions of the hollow thermoplastic synthetic resin panels B1 and B2 by intramolecular ultrasonic vibrations generated in the materials forming the hollow thermoplastic synthetic resin panels B1 and B2. The frictional effect of the intramolecular ultrasonic vibrations is remarkable particularly in the interface between the second sheet 2b of the first panel B1 and the first sheet 2a of the second panel B2, and hence portions of the panels B1 and B2 around the interface are heated most intensely and melted.

Figure 18:
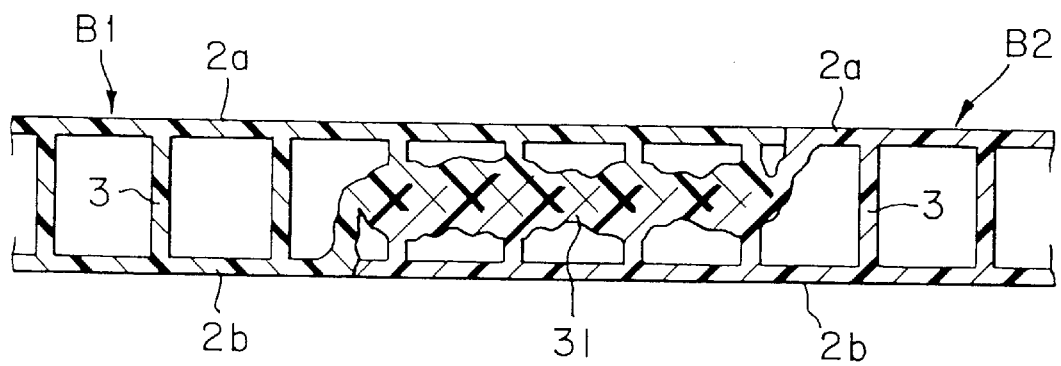
FIG. 18 is sectional view of a welded portion of a structure formed by welding together the two hollow thermoplastic synthetic resin panels by the welding process illustrated in FIGS. 15, 16 and 17.

Consequently, the portions of the hollow thermoplastic synthetic resin panels B1 and B2 around the interface are fused and welded together as the ultrasonic welding head 6C advances from the position shown in FIG. 16 to the position shown in FIG. 17 and, finally, the overlapping portions of the width W of the hollow thermoplastic synthetic resin panels B1 and B2 are compressed to a thickness equal to or less than the thickness of the panel B1 or B2. As best shown in FIG. 17, portions of the panels B1 and B2 in an intermediate region 30 are melted most intensely, the first sheet 2a of the first hollow thermoplastic synthetic resin panel B1 and the second sheet 2b of the second hollow thermoplastic synthetic resin panel B2 are not deformed, and the two panels B1 and B2 are joined together in a single hollow panel structure. The temperature of the molten portions returns to an ordinary temperature in a relatively short time after the ultrasonic vibrations have been stopped. Thus, the hollow thermoplastic synthetic resin panels B1 and B2 are joined together in a single hollow panel structure as shown in FIG. 18. Portions of the panels B1 and B2 in the intermediate region 30 are fused and solidified in a welded joint 31 and the panels B1 and B2 are joined firmly together. The thickness of the joint of the panels B1 and B2 can be adjusted by properly adjusting the final distance between the ultrasonic welding head 6C and the work support block 7C, and the joint can be formed in a thickness slightly smaller than the thickness of each hollow thermoplastic synthetic resin panel.

Figure 19:
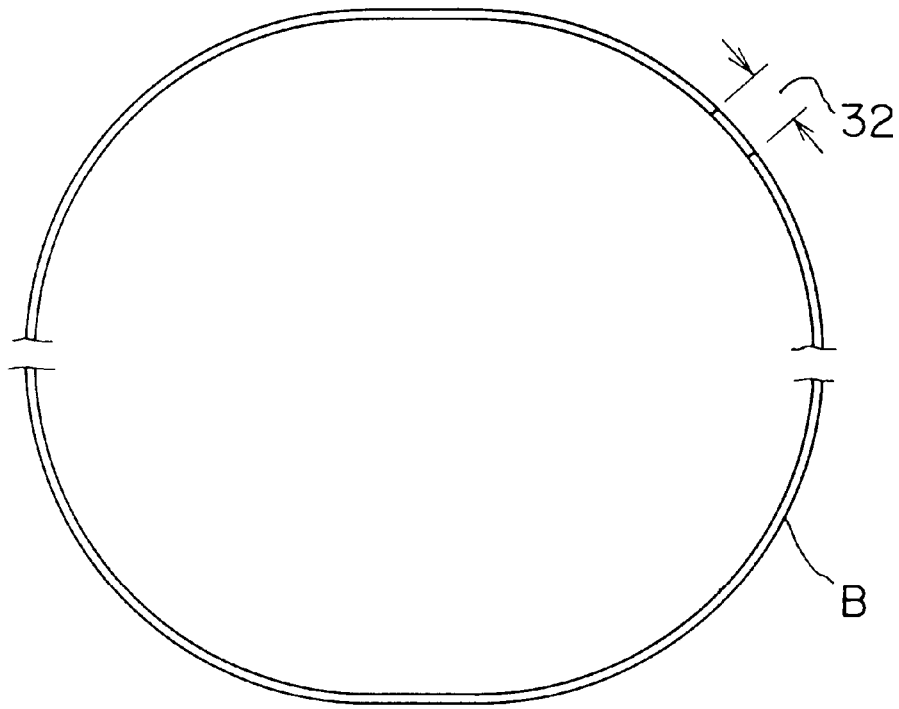
FIG. 19 is an end view of a circular tube formed by welding together the opposite side ends of a single hollow thermoplastic synthetic resin panel.

While in the above stated structure, two different panels are welded, a single panel can be welded together to form a hollow panel structure shown in FIG. 19. In this case the opposite end edge portions of a single hollow thermoplastic synthetic resin panel B are welded together. The hollow thermoplastic synthetic resin panel B is rolled in a tubular shape so that the opposite end edge portions thereof overlap each other, and the overlapping end edge portions are welded to form a joint 32.

Figure 20:
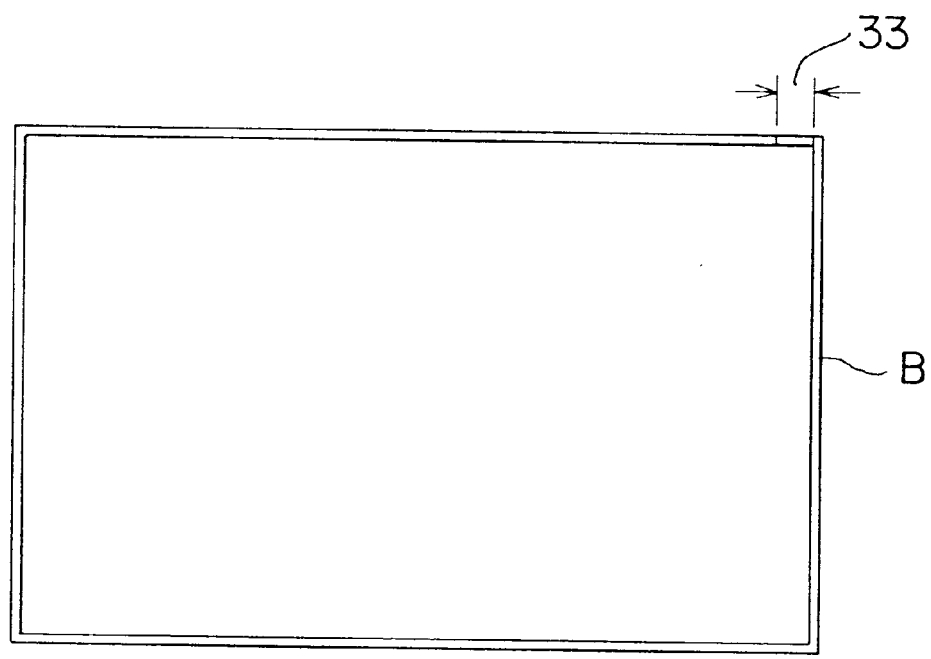
FIG. 20 is an end view of a rectangular tube formed by welding together the opposite side ends of a single hollow thermoplastic synthetic resin panel.

When forming a hollow panel structure shown in FIG. 20, a hollow thermoplastic synthetic resin panel B is folded into a rectangular tube so that the opposite end edge portions thereof overlap each other, and then the overlapping end edge portions are welded together to form a joint 33. The hollow panel structures shown in FIGS. 19 and 20 are used as side walls of containers.

A circular bottom is bonded to the hollow panel structure shown in FIG. 19 having the shape of a circular tube to form a container having the shape of a circular cylinder. A rectangular bottom is bonded to the hollow panel structure shown in FIG. 20 having the shape of a rectangular tube to form a container having the shape of a rectangular prism.

Figure 22:
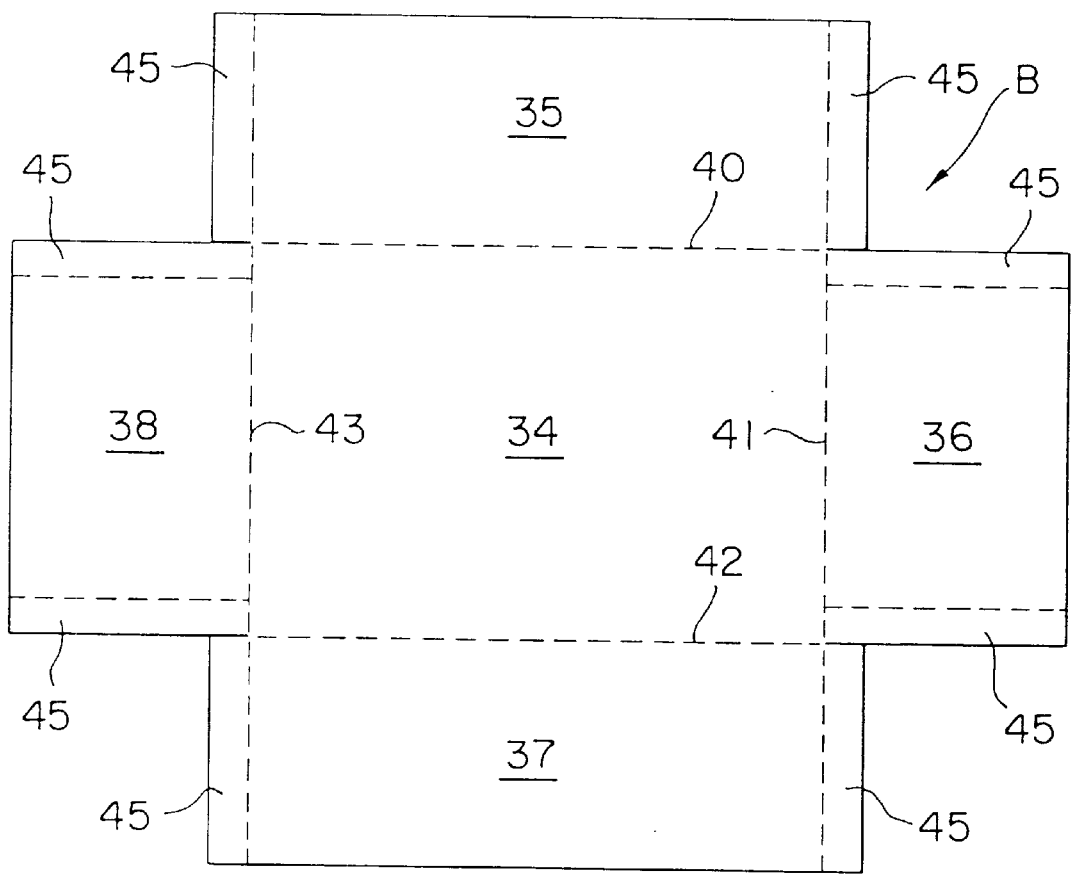
FIG. 22 is a development of a hollow thermoplastic synthetic resin panel box.

A container having the shape of a rectangular prism can be formed by folding a hollow thermoplastic synthetic resin panel B3 as shown in FIG. 22. The hollow thermoplastic synthetic resin panel B3 has a bottom section 34, four side sections 35, 36, 37 and 38, and folding lines 40, 41, 42 and 43, which may be similar to the linear groove 10 shown in FIG. 9 or the folding line 14 shown in FIG. 10. The side sections 35, 36, 37 and 38 are provided with bonding tabs 45. When forming a container by folding the hollow thermoplastic synthetic resin panel B3, the corresponding bonding tabs 45 are superposed and welded together by the welding procedure previously described with reference to FIGS. 15 to 17 to form joints of a thickness corresponding to that of the hollow thermoplastic synthetic resin panel B3.

Figure 21:
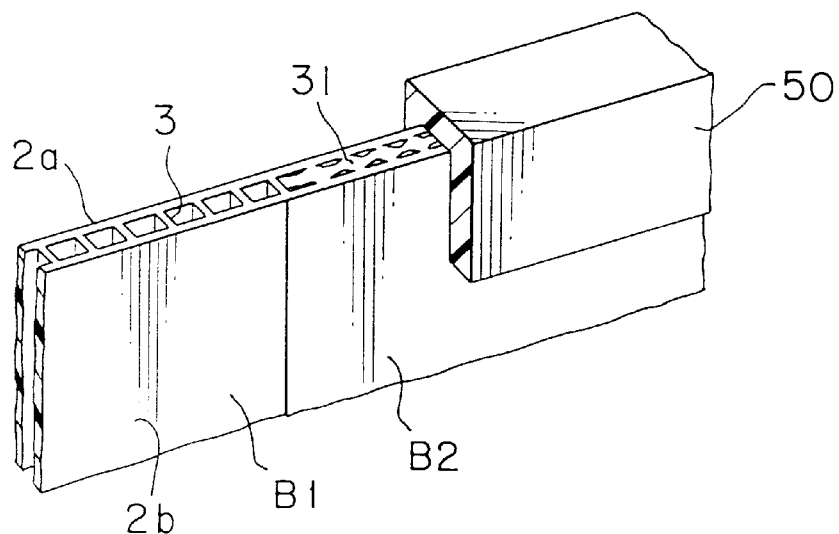
FIG. 21 is a perspective view of a hollow panel structure formed by successively connecting hollow thermoplastic synthetic resin panels, and a frame member combined with the hollow panel structure.

When necessary, frame members 50 having a cross section resembling an inverted letter U as shown in FIG. 21 may be put on the upper edges of the side walls of the container thus formed and the frame members 50 may be welded to the side walls by the previously described method. In FIG. 21, a frame member 50 is put on and welded to an edge of the hollow panel structure formed by connecting two hollow thermoplastic synthetic resin panel B1 and B2 as shown in FIG. 18.

Figure 23:
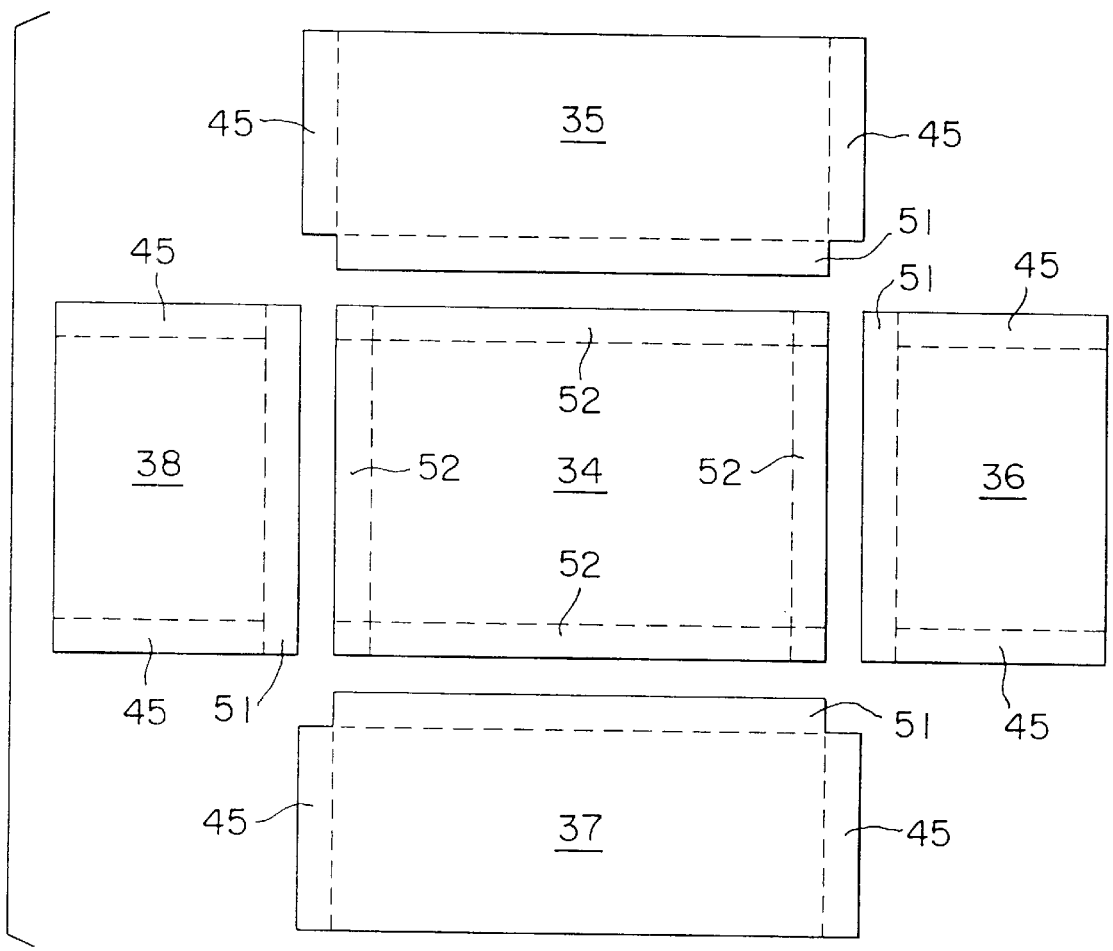
FIG. 23 is a development of another hollow thermoplastic synthetic resin panel box.

FIG. 23 shows separate component hollow thermoplastic synthetic resin panels for forming a container having the shape of a rectangular prism. This container is formed by assembling one bottom panel 34 and four side panels 35, 36, 37 and 38. The bottom panel 34 is provided on its four sides with bonding tabs 52, the side panels 35, 36, 37 and 38 are provided on their bottom sides with bonding tabs 51. The bonding tabs 51 of the side panels 35, 36, 37 and 38, and the bonding tabs 52 of the bottom panel 34 are superposed, respectively, and the bonding tabs 51 and 52 are welded together by the welding procedure previously described with reference to FIGS. 15 to 17 to obtain a blank panel of a shape as shown in FIG. 22. Then, the blank panel is folded and bonding tabs 45 of the side panels 35, 36, 37 and 38 are welded together by the same method as that previously described with reference to FIG. 22 to obtain a container having a rectangular prism.

Figure 24:
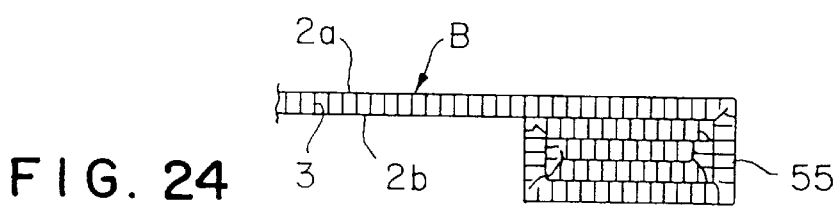
FIG. 24 is a sectional view of a reinforced edge portion of a hollow thermoplastic synthetic resin panel before completion.
Figure 25:
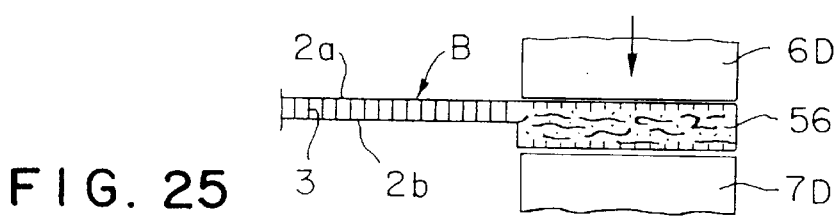
FIG. 25 is a sectional view of the reinforced edge portion of the hollow thermoplastic synthetic resin panel of FIG. 24 after completion.

FIGS. 24 and 25 illustrates a method of reinforcing an end edge of a hollow thermoplastic synthetic resin panel B. As shown in FIG. 24, an edge portion of the hollow thermoplastic synthetic resin panel B is folded in two, three or more layers in a layered structure 55 of an appropriate width, the ultrasonic welding head 6D and the work support block 7D of an ultrasonic welding machine is applied to the opposite surfaces of the layered structure 55, and the layered structure 55 is compressed and welded by the welding procedure previously described with reference to FIGS. 15 to 17 to form a strong, reinforced edge portion 56 of a thickness smaller than that of the layered structure 55 integrally with the hollow thermoplastic synthetic resin panel B.

Figure 26:
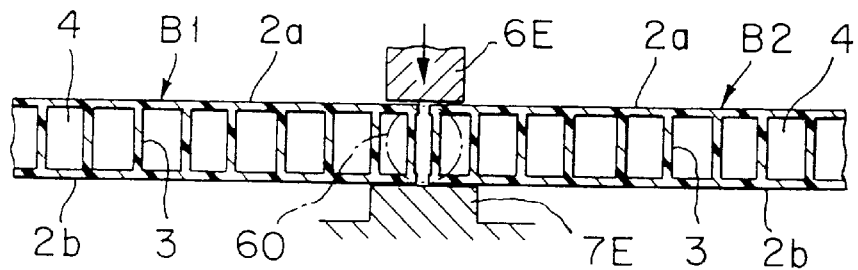
FIG. 26 a sectional view of two hollow thermoplastic synthetic resin panels, explaining a method of butt welding the two hollow thermoplastic synthetic resin panels.

FIG. 26 illustrates a hollow panel structure formed by butt-welding two hollow thermoplastic synthetic resin panels B1 and B2. The right side edge portion of the left panel B1 and the left side edge portion of the right panel B2 are disposed edge to edge between the ultrasonic welding head 6E and the work support block 7E of an ultrasonic welding machine, the ultrasonic welding head 6E is driven to generate ultrasonic waves while the same is moved toward the work support block 7E to compress the joint 60 of the side edge portions. Both the ultrasonic welding head 6E and the work support block 7E have flat working surfaces capable of being brought into close contact with the surfaces of the hollow thermoplastic synthetic resin panels B1 and B2.

Heat is generated in the joint 60 by the ultrasonic vibrations of the joint 60, the side edge portions are melted and welded. The melted joint 60 solidifies after the ultrasonic vibration of the ultrasonic welding head 6E has been stopped and the two hollow thermoplastic synthetic resin panels B1 and B2 are joined together in a single hollow thermoplastic synthetic resin panel.

Figure 27:
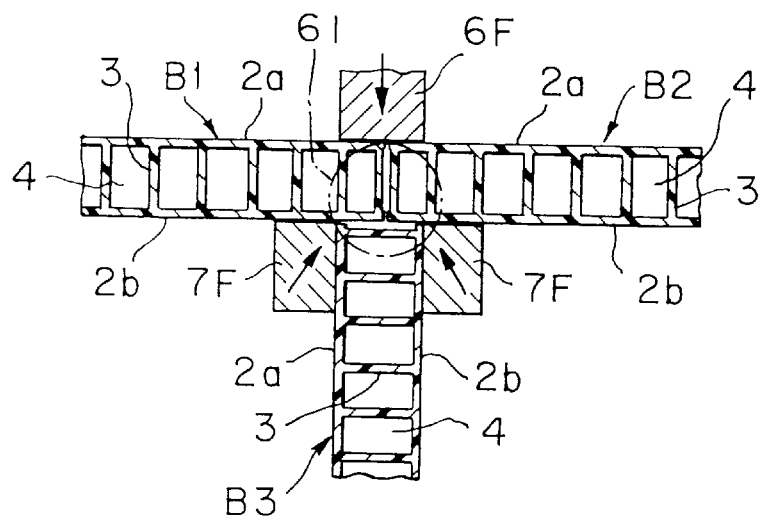
FIG. 27 is a sectional view of three hollow thermoplastic synthetic resin panels, explaining a method of butt welding the three hollow thermoplastic synthetic resin panels.
Figure 28:
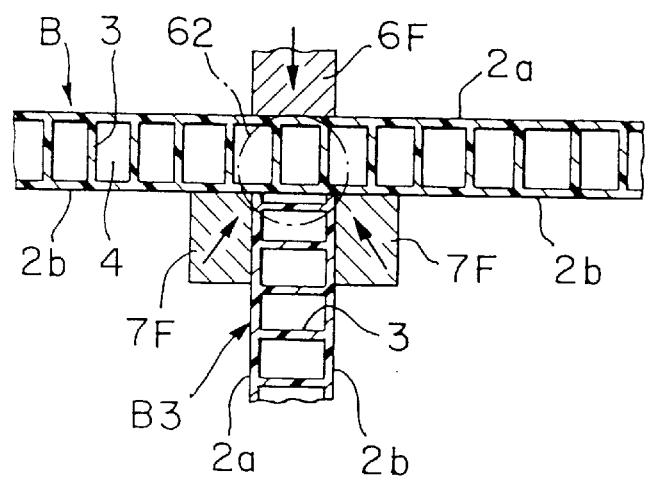
FIG. 28 is a sectional view of two hollow thermoplastic synthetic resin panels, explaining a method of welding the two hollow thermoplastic synthetic resin panels at an angle.

FIG. 27 illustrates a hollow panel structure formed by butt-welding first and second hollow thermoplastic synthetic resin panels B1 and B2, and butt-welding a third hollow thermoplastic synthetic resin panel B3 to the joint of the first and the second hollow thermoplastic synthetic resin panels B1 and B2 perpendicularly to the second sheets 2b of the first and the second panels B1 and B2. A pair of work support blocks 7F are disposed so as to hold the third panel B3 therebetween and to support the first hollow thermoplastic synthetic resin panel B1 and the second hollow thermoplastic synthetic resin panel B2. An ultrasonic welding head 6F pressed against the first sheets 2a of the panels B1 and B2 is driven to generate ultrasonic waves to generate heat in the joint 61 of the panels B1, B2 and B3, so that the joint 61 is melted and welded. The work support blocks 7F are biased in the direction of the arrows to compress the joint 61 between the ultrasonic welding head 6F and the work support blocks 7F. The third hollow thermoplastic synthetic resin panel B3 may be inclined at an angle other than 90° to the second sheets 2b of the panels B1 and B2. FIG. 28 illustrates a hollow panel structure formed by welding together a single hollow thermoplastic synthetic resin panel B, instead of the two hollow thermoplastic synthetic resin panels B1 and B2 shown in FIG. 27, and a hollow thermoplastic synthetic resin panel B3. The hollow panel structure illustrated in FIG. 28 is entirely the same in principle as that illustrated in FIG. 27. A joint 62 is formed in the hollow panel structure shown in FIG. 28. In FIGS. 27 and 28, an optional hollow thermoplastic synthetic resin member may be welded to the hollow thermoplastic synthetic resin panels B1 and B2 or the hollow thermoplastic synthetic resin panel B instead of the third hollow thermoplastic synthetic resin panel B3.

Figure 29:
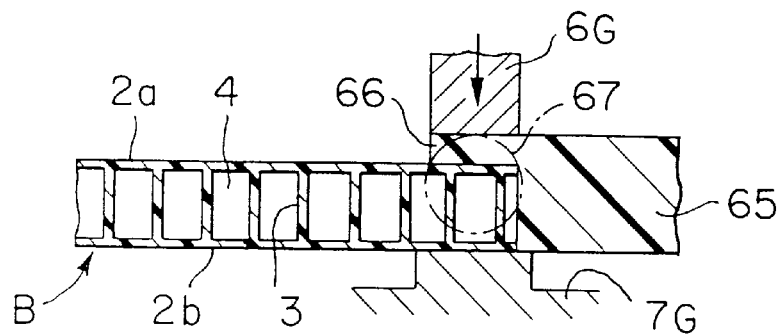
FIG. 29 is sectional view, explaining a method of welding a part to one side edge portion of a hollow thermoplastic synthetic resin panel.

FIG. 29 illustrates a hollow panel structure formed by welding a thermoplastic synthetic resin member 65 to a side edge of a hollow thermoplastic synthetic resin panel B. The thermoplastic synthetic resin part 65 has a projection 66 having the shape of a flat plate and set in contact with the first sheet 2a of the hollow thermoplastic synthetic resin panel B. The ultrasonic welding head 6G of an ultrasonic welding machine is pressed against the projection 66, and the work support block 7G of the ultrasonic welding machine is pressed against the second sheet 2b of the hollow thermoplastic synthetic resin panel B and a portion of the thermoplastic synthetic resin member 65. A welded joint 67 is formed. If the projection 66 of the thermoplastic synthetic resin member 65 does not have a shape resembling a flat plate, it is desirable to place the ultrasonic welding head in contact with the second sheet 2b of the hollow thermoplastic synthetic resin panel B and to place the work support block in contact with the projection 66.

Figure 30:
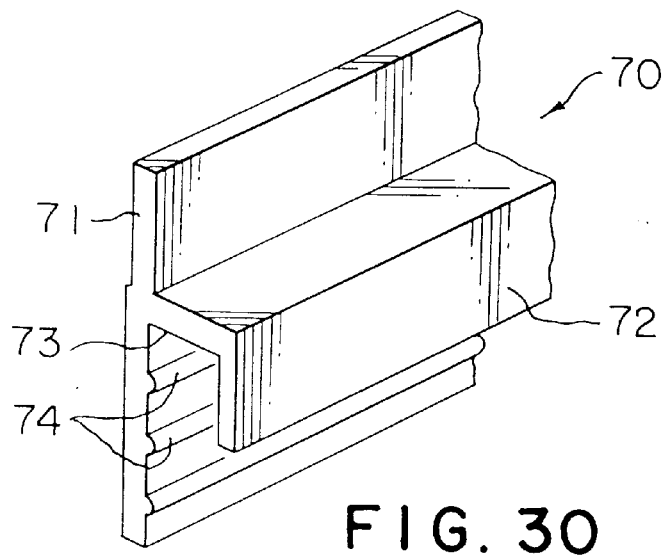
FIG. 30 is a fragmentary perspective view of an edge member.

FIG. 30 shows an edge trimming member 70 for trimming an edge of an open end of a box formed by processing a hollow thermoplastic synthetic resin panel. The edge trimming member 70 is formed by extruding a thermoplastic synthetic resin, such as a polypropylene resin, a polyethylene resin or a polycarbonate resin, end has a base 71, and a clipping lug 72 having a cross section resembling the inverted letter L and projecting from the base 71 so as to define a groove 73. Longitudinal ridges 74 are formed on the inner surface of the base 71 facing the clipping lug 72. The vertical size, as viewed in FIG. 30, of a portion provided with the ridges 74 of the base 71 is greater than that of the clipping lug 72.

The edge of the hollow thermoplastic synthetic resin panel is fitted in the groove 73 of the edge trimming member 70 so that the base 71 is in contact with the outer surface of the hollow thermoplastic synthetic resin panel. An ultrasonic welding head and a work support block are applied to the assembly of the hollow thermoplastic synthetic resin panel and the edge trimming member 70 in a manner as shown in FIG. 29. For example, the ultrasonic welding head is applied to the outer surface of the base 71 at a position corresponding to the ridges 74. The ridges 74 increases the area of a melted portion for effective welding.

Figure 31:
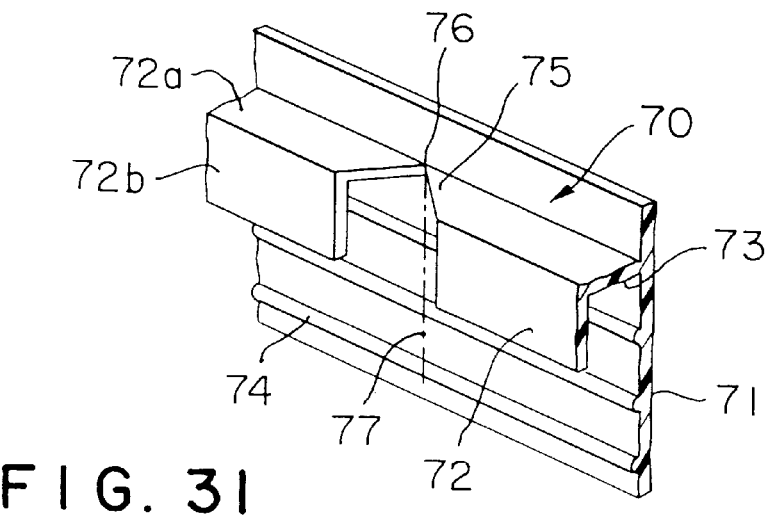
FIG. 31 is a perspective view of the edge member of FIG. 30 provided with a notch necessary for bending the same.

When applying the edge trimming member 7C to the upper edges of the side walls of a box having the shape of a rectangular prism, the edge trimming member 70 needs to be bent at right angles at three positions, and the opposite ends of the edge trimming member 70 needs to be butted to form a rectangular frame. Notches 75 are formed in the clipping lug 72 as shown in FIG. 31. Each notch 75 is formed by removing a triangular portion having the shape of a rectangular equilateral triangle from an upper wall 72a of the clipping lug 72, and a rectangular portion having the shape of a rectangle and a width equal to the length of the base of the triangular portion from a side 72b of the clipping lug 72. The edge trimming member 70 is bent along a folding line 77 passing the apex 76 of the triangular space of the notch 75.

Figure 32:
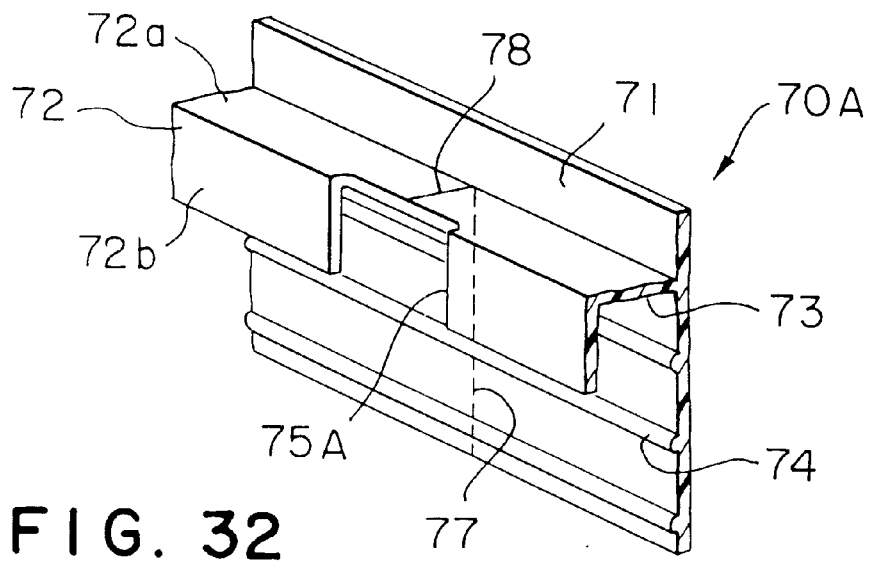
FIG. 32 is a perspective view of an edge member provided with another notch necessary for bending the same.

FIG. 32 shows an edge trimming member 70A in a modification of the edge trimming member 70 of FIG. 31. The edge trimming member 70A is provided with a notch 75A of a shape different from that of the notch 75 of the edge trimming member 70. The edge trimming member 70A is provided with a slit 78 in the upper wall 72a of the clipping lug 72 instead of the triangular space of the edge trimming member 70. A folding line 77 is formed at a position corresponding to the slit 78.

Figure 33:
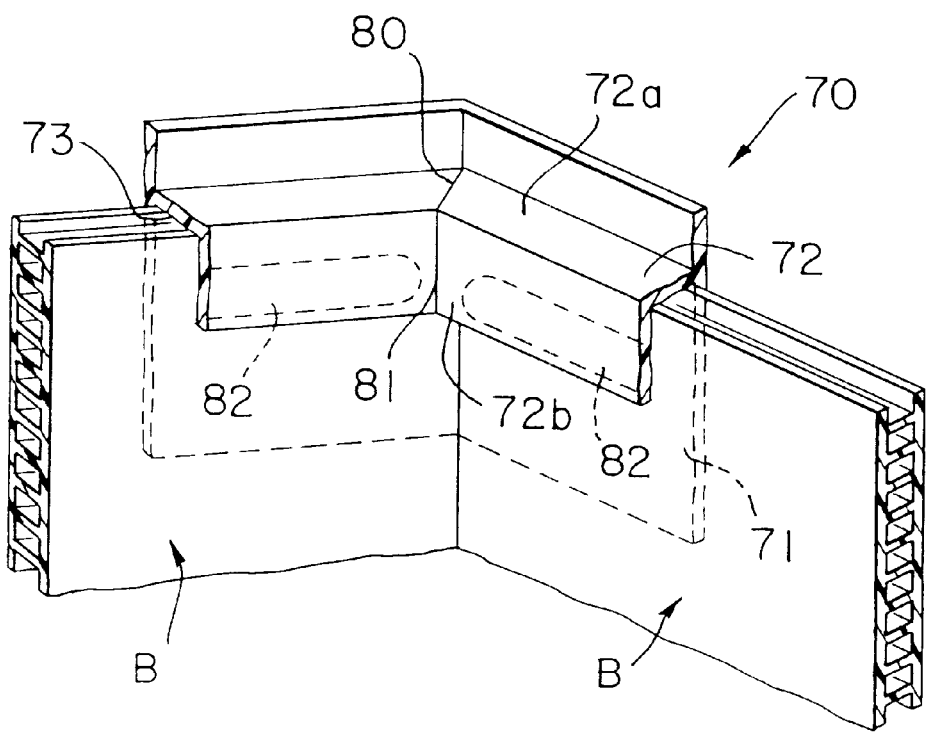
FIG. 33 is a perspective view of the edge member of FIG. 31 bent and attached to a hollow thermoplastic synthetic resin panel.

FIG. 33 shows hollow thermoplastic synthetic resin panels B forming side walls of a box, and the edge trimming member 70 of FIG. 31 attached to the upper edges of the hollow thermoplastic synthetic resin panels B. When the edge trimming member 70 is bent along the folding line 77 toward the notch 75, edges of the upper wall 72a defining the oblique sides of the triangular space are joined together in a line 81. When the edge trimming member 70 is welded to the hollow thermoplastic synthetic resin panels B, welded joints 82 are formed.

Figure 34:
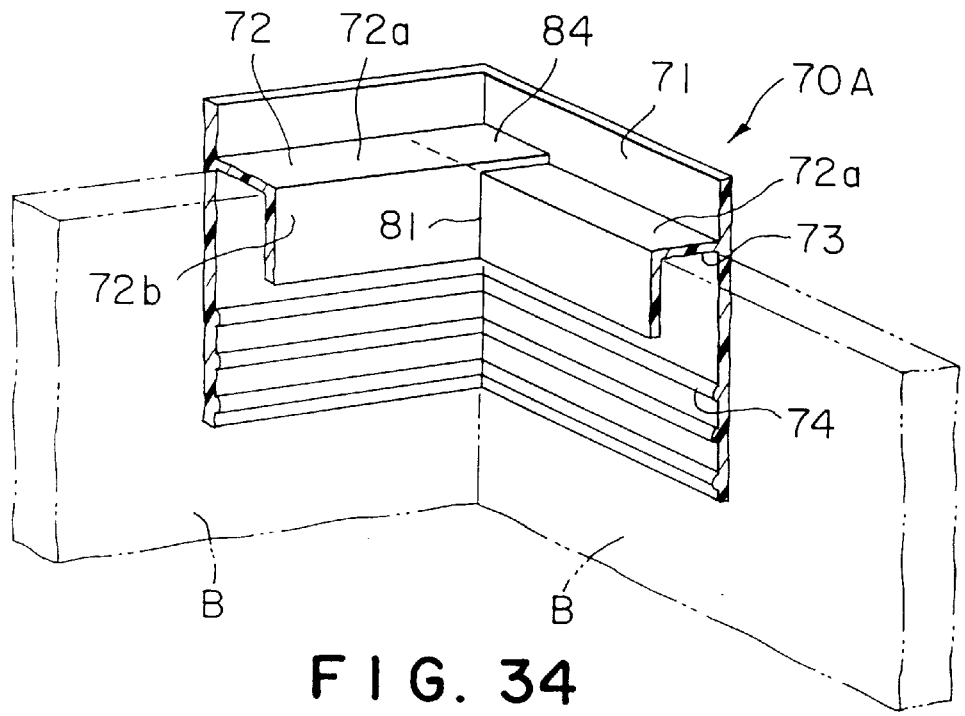
FIG. 34 is a perspective view of the edge member of FIG. 32 bent and attached to a hollow thermoplastic synthetic resin panel.

Similarly, the edge trimming member 70A of FIG. 32 is welded to hollow thermoplastic synthetic resin panels B as shown in FIG. 34. In the edge trimming member 70A, adjacent portions 84 of the upper wall 72a on the opposite sides of the slit 78 overlap each other as shown in FIG. 34.

Figure 35:
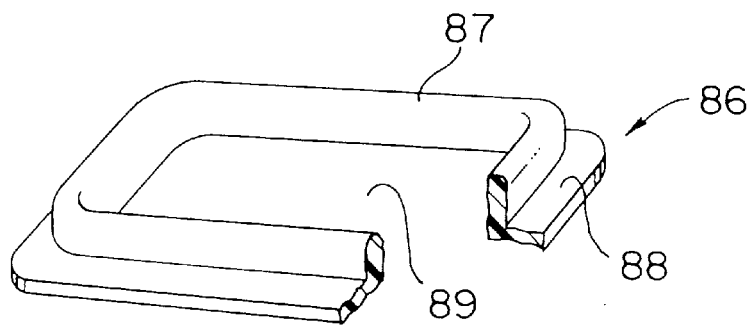
FIG. 35 is a perspective view of a grip.
Figure 36:
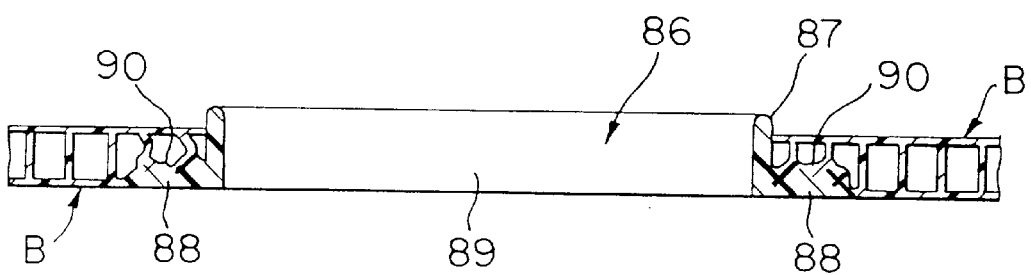
FIG. 36 is a sectional view of a hollow thermoplastic synthetic resin panel to which the grip of FIG. 35 is welded.

FIG. 35 shows a grip 86 to be attached to a container formed by assembling hollow thermoplastic synthetic resin panels. The grip 86 has a ring 87 and a flange 88 spreading out from the ring 87. The ring 87 define an opening 89. The grip 86 may be formed in the shape of an inverted letter U. The grip 86 is made of a thermoplastic synthetic resin. As shown in FIG. 36, thus grip 86 is welded to a hollow thermoplastic synthetic resin panel B. An opening corresponding to the ring 87 of the grip 86 is formed in the hollow thermoplastic synthetic resin panel B, the ring 87 is fitted in the opening so that the ring 87 project from one surface of the hollow thermoplastic synthetic resin panel B and the flange 88 is in close contact with the other surface of the hollow thermoplastic synthetic resin panel B. The ultrasonic welding head of an ultrasonic welding machine is applied to the outer surface of the flange 88, and the work support block of the ultrasonic welding machine is applied to a portion of the hollow thermoplastic synthetic resin panel B corresponding to the flange 88, and then flange 88 and the corresponding portion of the hollow thermoplastic synthetic resin panel B are compressed and ultrasonic waves are applied to the same to form a welded joint 90. The flange 88 is incorporated into the hollow thermoplastic synthetic resin panel B so as to form a portion of the latter. If the grip 86 has the shape of an inverted letter U, portions of the first and the second sheet of the hollow thermoplastic synthetic resin panel B forming an edge of the opening corresponding to the open side of the grip 86 are welded together to close or seam the open edge of the hollow thermoplastic synthetic resin panel B.

Figure 37:
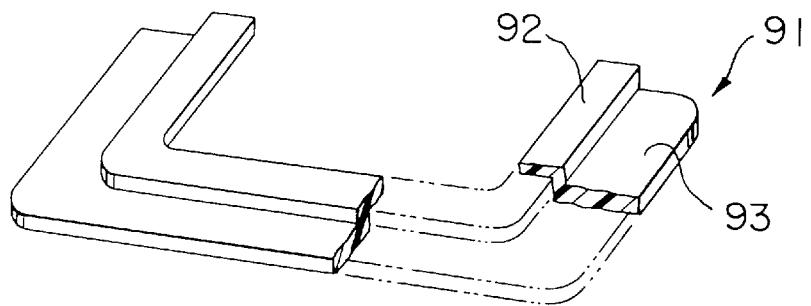
FIG. 37 is a perspective view of a card holder.
Figure 38:
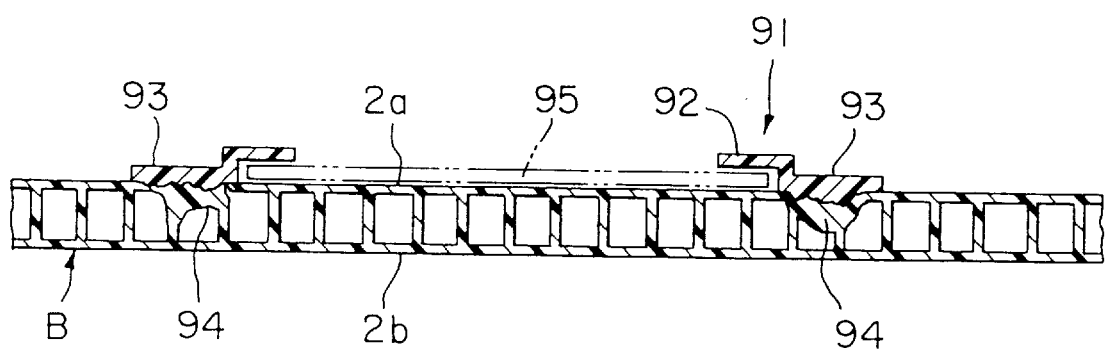
FIG. 38 is a sectional view of a hollow thermoplastic synthetic resin panel and the card holder welded to the hollow thermoplastic synthetic resin panel.

Referring to FIG. 37, a card holder 91 has a frame 92 of a shape resembling the letter U, and a flange 93 formed integrally with and extending outward from the frame 92. The frame 92 is raised from the flange 93 so as to define a space for receiving the periphery of a card 95 therein as shown in FIG. 38. The card holder 91 is made of a thermoplastic synthetic resin. As shown in FIG. 38, the flange is attached to the outer surface of a hollow thermoplastic synthetic resin panel B by ultrasonic welding. The ultrasonic welding head of an ultrasonic welding machine is applied to the flange 93 and a welded joint 94 is formed to weld the flange 93 of the card holder 91 to the hollow thermoplastic synthetic resin panel B.

Figure 39:
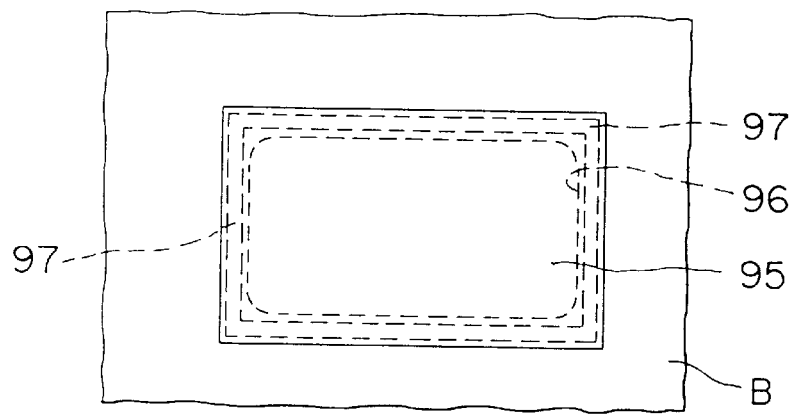
FIG. 39 is a plan view of a hollow thermoplastic synthetic resin panel to which a transparent plate is welded.

Referring to FIG. 39, a transparent plate 95 of a thermoplastic synthetic resin is attached to a hollow thermoplastic synthetic resin panel B to enable the observation of the interior of a container formed by folding the hollow thermoplastic synthetic resin panel B. A rectangular opening 96 of a predetermined size is formed in the hollow thermoplastic synthetic resin panel B, the transparent plate 95 of a size slightly greater than that of the opening 96 is put on the hollow thermoplastic synthetic resin panel B so as to cover the opening 96, the ultrasonic welding head of an ultrasonic welding machine is applied to the periphery of the transparent plate 95, the work support block of the ultrasonic welding machine is applied to the hollow thermoplastic synthetic resin panel B so as to correspond to the ultrasonic welding head, the periphery of the transparent plate 95 and the corresponding portion of the hollow thermoplastic synthetic resin panel B are compressed between the ultrasonic welding head and the work support block, and the ultrasonic welding head is driven to form a welded joint 97.

Figure 40:
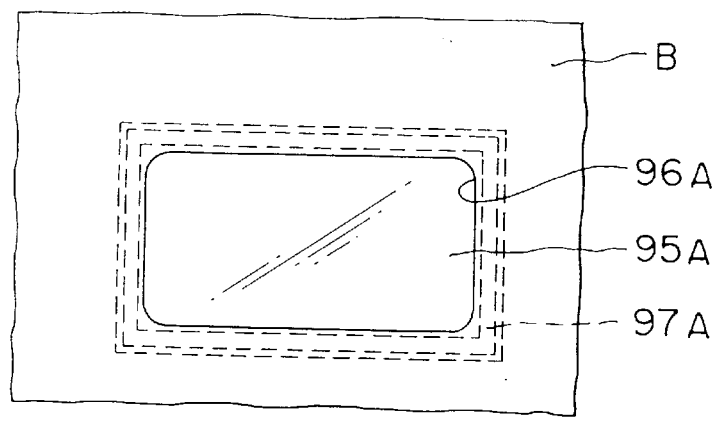
FIG. 40 is a plan view of another hollow thermoplastic synthetic resin panel to which a transparent plate is welded.
Figure 41:
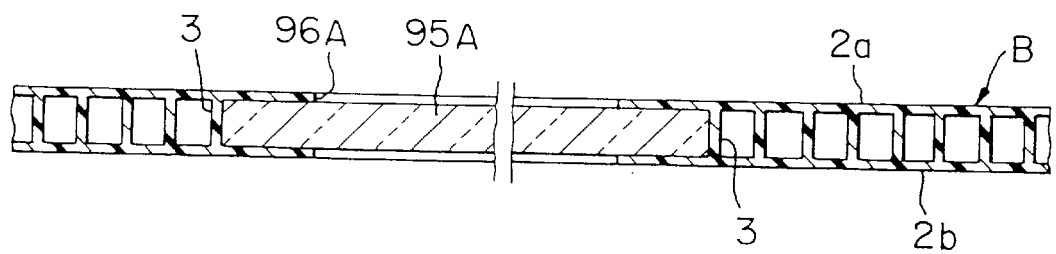
FIG. 41 is a sectional view of the hollow thermoplastic synthetic resin panel of FIG. 40.

FIGS. 40 and 41 shows another transparent plate 95A attached to a hollow thermoplastic synthetic resin panel B so as to cover an opening 96A formed in the hollow thermoplastic synthetic resin panel B. Portions of the ribs 3 of the hollow thermoplastic synthetic resin panel B around the opening 96A are removed so that portions of the first sheet 2a and the second sheet 2b of the hollow thermoplastic synthetic resin panel B around the opening 96A can be warped away from each other, the periphery of the transparent plate 95A is inserted in a space between the first sheet 2a and the second sheet 2b as shown in FIG. 41. Then, the periphery of the transparent plate 95A is welded to edge portions of the first sheet 2a and the second sheet 2b around the opening 95A by ultrasonic welding to form a welded joint 97A.

INDUSTRIAL APPLICABILITY

The thermoplastic synthetic resin panel welding methods of the present invention are capable of forming various types of bonds of high quality in hollow panel structures formed by processing hollow thermoplastic synthetic resin panels, and the hollow panel structures fabricated by the thermoplastic synthetic resin panel welding methods of the present invention are applicable to versatile uses as building materials and packaging materials.

We claim:

1. A thermoplastic synthetic resin panel structure comprising a thermoplastic synthetic resin panel consisting of a first sheet, a second sheet parallel to the first sheet, and a plurality of ribs integrally joining the first and second sheets and defining a plurality of spaces between the first and second sheets, wherein portions of the first and second sheets along a line or a plane extending across the ribs are welded together by ultrasonic welding.

2. The thermoplastic synthetic resin panel structure according to claim 1, wherein the line extends along an end edge of the thermoplastic synthetic resin panel.

3. The thermoplastic synthetic resin panel structure according to claim 1, wherein a portion of the first sheet extending along the line is depressed toward the second sheet and welded to the second sheet by ultrasonic welding.

4. The thermoplastic synthetic resin panel structure according to claim 1, wherein portions of the first and the second sheet extending along the line are depressed toward each other and welded together by ultrasonic welding.

5. A thermoplastic synthetic resin panel structure comprising first and second hollow thermoplastic synthetic resin panels of the same construction consisting of a first sheet, a second sheet parallel to the first sheet, and a plurality of ribs integrally joining the first and second sheets and defining a plurality of spaces between the first and second sheets; wherein the first and second thermoplastic synthetic resin panels are disposed so that side edges thereof butt on each other, and the side edges of the first and second thermoplastic synthetic resin panels are welded together by ultrasonic welding.

6. A thermoplastic synthetic resin panel welding method comprising the steps of:

preparing a hollow thermoplastic synthetic resin panel consisting of a first sheet, a second sheet parallel to the first sheet, and ribs defining a plurality of spaces between the first and second sheets;

folding an end portion of the thermoplastic synthetic resin panel in layers;

holding the layers of the hollow thermoplastic synthetic resin panel between an ultrasonic welding head and an work support block of an ultrasonic welding machine;

driving the ultrasonic welding head to generate frictional heat in the layers of the thermoplastic synthetic resin panel by ultrasonic vibrations so that the layers of the thermoplastic synthetic resin panel are welded together to form an edge portion of a thickness greater than that of the thermoplastic synthetic resin panel.

7. The hollow thermoplastic synthetic resin panel welding method according to claim 6, wherein the layers are compressed to reduce the thickness thereof while the layers are being welded.

8. A thermoplastic synthetic resin panel welding method comprising the steps of:

preparing a first thermoplastic synthetic resin panel consisting of a first sheet, a second sheet parallel to the first sheet, and ribs integrally joining the first and second sheets and defining a plurality of spaces between the first and the second sheets, and a second thermoplastic synthetic resin panel of the same construction as that of the first thermoplastic synthetic resin panel;

disposing the first and second hollow thermoplastic synthetic resin panels with side edges thereof pressed against each other to form a butting section;

placing an ultrasonic welding machine with an ultrasonic welding head thereof and a work support means thereof disposed opposite to each other with respect to a direction perpendicular to the thickness of the butting section on the opposite sides of the butting section, respectively;

driving the ultrasonic welding head to generate frictional heat in the end surfaces of the thermoplastic synthetic resin panels butting on each other by ultrasonic vibration so that the end surfaces of the thermoplastic synthetic resin panels butting each other are fused and welded together to connect the first and the second thermoplastic synthetic resin panels in a single thermoplastic synthetic resin panel.

9. A thermoplastic synthetic resin panel welding method comprising the steps of:

preparing first, second and third thermoplastic synthetic resin panels of the same construction each consisting of a first sheet, a second sheet parallel to the first sheet and ribs integrally joining the first and the second sheet and defining a plurality of spaces between the first and second sheets;

placing the first and second thermoplastic synthetic resin panels so as to form an edge-to-edge junction;

placing the third thermoplastic synthetic resin panel at an angle to the surfaces of the first and second thermoplastic synthetic resin panels so that its side edge butts on the edge-to-edge junction of the first and the second thermoplastic synthetic resin panels;

placing an ultrasonic welding machine with an ultrasonic welding head thereof in contact with the edge-to-edge junction of the first and second thermoplastic synthetic resin panels on a side opposite the side on which the third thermoplastic synthetic resin panel butts on the edge-to-edge junction of the first and second thermoplastic synthetic resin panels, and with a work support means of the ultrasonic welding machine in contact with a region around the junction of the first, second and third thermoplastic synthetic resin panels;

driving the ultrasonic welding head to generate frictional heat in the junction of the first, second and third thermoplastic synthetic resin panels so that the portions of the first, second and third thermoplastic synthetic resin panels in the junction are fused and welded together.

10. A thermoplastic synthetic resin panel welding method comprising the steps of:

preparing first and second thermoplastic synthetic resin panels of the same construction each consisting of a first sheet, a second sheet parallel to the first sheet, and ribs integrally joining the first and second sheets and defining a plurality of spaces between the first and second sheets;

placing the second thermoplastic synthetic resin panel at an angle to one surface of the first thermoplastic synthetic resin panel with a side edge of the second panel butting on the surface of the first thermoplastic synthetic resin panel;

placing an ultrasonic welding machine with an ultrasonic welding head thereof in contact with a portion of the other surface of the first thermoplastic synthetic resin panel corresponding to the junction of the first and second thermoplastic synthetic resin panels, and with a work support means of the ultrasonic welding machine in contact with portions of the surface of the first thermoplastic synthetic resin panel on the opposite sides of the second thermoplastic synthetic resin panel and with portions of the opposite surfaces of the second thermoplastic synthetic resin panel;

driving the ultrasonic welding head to generate frictional heat in portions of the first and second thermoplastic synthetic resin panels corresponding to the junction so that those positions are fused and welded together.

11. A thermoplastic synthetic resin panel welding method comprising the steps of:

preparing a hollow thermoplastic synthetic resin panel (B) having a first sheet (2a), a second sheet (2b) parallel to the first sheet, and ribs (4) interposed between the first and second sheets to integrally join the first and second sheets and extending in parallel in a first direction, said first and second sheets having respective end edges in parallel opposing relation and extending in a second direction crossing said first direction;

providing an ultrasonic welding machine with an ultrasonic welding head (6) and a work support block (7), said welding head (6) having an end surface and said work support block (7) having a flat work support surface cooperable with said end surface of the welding head (6), said end surface of the welding head having a protruding outer edge portion and a sloping surface portion contiguously provided adjacent said outer edge portion;

placing said ultrasonic welding head (6) with said outer edge portion thereof disposed in opposition to and along said end edge of the first sheet (2a) and with said sloping surface portion thereof disposed inwardly of said end edge of the first sheet (2a);

placing said work support block (7) with said flat work support surface thereof disposed in a face-to-face relation with a portion of said second sheet (2b) adjacent and along the end edge of the second sheet:

moving said welding head (6) and said work support block (7) toward each other to bring the welding head and the work support block into contact with the first and second sheets, respectively;

generating ultrasonic waves from said welding head (6) to said work support block (7) through said first sheet (2a), said ribs (4) and said second sheet (2b) to said work support block (7) to generate internal frictional heat by ultrasonic vibration so as to melt the first sheet, the ribs and the second sheet in portions thereof in which ultrasonic waves are generated;

compressing the first and second sheets between the end surface of said welding head (6) and the flat work support surface of said work support block with said protruding outer edge portion of the welding head abutting against said end edge of the first sheet;

causing said protruding outer edge portion of the welding head to move the end edge of the first sheet toward and against the end edge of the second sheet;

causing said sloping surface portion of the welding head to move an end region of the first sheet adjacent said end edge thereof toward an end region adjacent the end edge of the second sheet, to thereby shape said end region of the first sheet to conform in shape to the sloping surface portion;

concurrently causing said sloping surface portion of the welding head to shape portions of said ribs adjacent the end edges of the first and second sheets to conform in shape to the sloping surface portion, thereby joining the end edge of the first sheet to the end edge of the second sheet to form a closed end seam (8) of a converging cross-sectional shape along said end edges.

12. The thermoplastic synthetic resin panel welding method according to claim 11, wherein said sloping surface portion of the welding head (6) has a concave curved shape so that said closed end seam (8) is given a convex curved shape on the side of the first sheet (2a).

13. A thermoplastic synthetic resin panel welding method comprising the steps of:

preparing a hollow thermoplastic synthetic resin panel (B) having a first sheet (2a), a second sheet (2b) parallel to the first sheet, and ribs (4) interposed between the first and second sheets to integrally join the first and second sheets and extending in parallel in a first direction;

providing an ultrasonic welding machine with an ultrasonic welding head (6) and a work support block (7), said welding head (6) having an end surface and said work support block (7) having a flat work support surface cooperable with said end surface of the welding head (6), said end surface of the welding head having a middle nose (9) and a pair of side sloping surface portions contiguously provided on both sides of said middle nose; placing said ultrasonic welding head (6) with said end surface thereof disposed in opposition to the first sheet (2a) and with the middle nose thereof extending in a second direction crossing said first direction;

placing said work support block (7) with said flat work support surface thereof disposed in a face-to-face relation with said second sheet (2b) and in confronting relation with said end surface of the welding head;

moving said welding head (6) and said work support block (7) toward each other to bring the welding head and the work support block into contact with the first and second sheets, respectively;

generating ultrasonic waves from said welding head (6) to said work support block (7) through said first sheet (2a), said ribs (4) and said second sheet (2b) to said work support block (7) to generate internal frictional heat by ultrasonic vibration so as to melt the first sheet, the ribs and the second sheet in portions thereof in which ultrasonic waves are generated;

compressing the first and second sheets between the end surface of said welding head (6) and the flat work support surface of said work support block;

causing said middle nose (9) of the welding head to move a linear region of the first sheet along the middle nose toward and against the second sheet;

causing said sloping surface portions of the welding head to move opposite adjoining regions on both sides of said linear region of the first sheet toward the second sheet to thereby shape said opposite adjoining regions of the first sheet to conform in shape to the sloping surface portions;

concurrently causing said sloping surface portions of the welding head to shape portions of said ribs between the welding head and the work support block to conform in shape to the sloping surface portions, thereby joining said linear region of the first sheet to the second sheet to form a linear groove (10) in the first sheet.

14. The thermoplastic synthetic resin panel welding method according to claim 13, wherein each of said sloping surface portions of the welding head (6) has a concave curved shape so that said linear groove (10) is given side surfaces each of a convex curved shape.

15. A thermoplastic synthetic resin panel welding method comprising the steps of:

preparing a hollow thermoplastic synthetic resin panel (B) having a first sheet (2a), a second sheet (2b) parallel to the first sheet, and ribs (4) interposed between the first and second sheets to integrally join the first and second sheets and extending in parallel in a first direction;

providing an ultrasonic welding machine with an ultrasonic welding head (6) and a work support block (7), said welding head (6) having an end surface and said work support block (7) having a work support surface cooperable with said end surface of the welding head (6), said end surface of the welding head having a middle nose (9) and a pair of side sloping surface portions contiguously provided on both sides of said middle nose, said work support surface of the work support block (7) having the same configuration as said end surface of the welding head;

placing said ultrasonic welding head (6) with said end surface thereof disposed in opposition to the first sheet (2a) and with the middle nose thereof extending in a second direction across said first direction;

placing said work support block (7) with said work support surface thereof disposed in opposition to the second sheet (2b) and in confronting relation with said end surface of the welding head;

moving said welding head (6) and said work support block (7) toward each other to bring the welding head and the work support block into contact with the first and second sheets, respectively;

generating ultrasonic waves from said welding head (6) to said work support block (7) through said first sheet (2a), said ribs (4) and said second sheet (2b) to said work support block (7) to generate internal frictional heat by ultrasonic vibration so as to melt the first sheet, the ribs and the second sheet in portions thereof in which ultrasonic waves are generated;

compressing the first and second sheets between the end surface of said welding head (6) and the work support surface of said work support block;

causing the middle noze (9) of the welding head to move a linear region of the first sheet along the middle nose toward and agaist the second sheet;

causing said sloping surface portions of the welding head to move opposite adjoining regions on both sides of said linear region of the first sheet toward the second sheet, to thereby shape said opposite adjoining regions of the first sheet to conform in shape to the sloping surface portions of the welding head;

causing the middle noze of the work support block to move a linear region of the second sheet along the middle nose toward and agaist the first sheet;

causing the sloping surface portions of the work support block to move opposite adjoining regions on both sides of said linear region of the second sheet toward the first sheet, to thereby shape said opposite adjoining regions of the second sheet to conform in shape to the sloping surface portions of the work support block;

concurrently causing the sloping surface portions of the welding head and the sloping surface portions of the work support block to shape portions of said ribs between the welding head and work support block to conform in shape to the sloping surface portions of the welding head and the work support block, thereby joining said linear regions of the first and second sheets to each other to form a linear folding line (14).

16. A thermoplastic synthetic resin panel welding method comprising the steps of:

preparing a hollow thermoplastic synthetic resin panel (B) having a first sheet (2a), a second sheet (2b) parallel to the first sheet, and ribs (4) interposed between the first and second sheets to integrally join the first and second sheets and extending in parallel in a first direction, said synthetic resin panel (B) having an opening (16) therethrough, said opening having a first edge of the first sheet and a second edge of the second sheet;

providing an ultrasonic welding machine with an ultrasonic welding head (6) and a work support block (7), said welding head (6) having an end surface and said work support block (7) having a flat work support surface cooperable with said end surface of the welding head (6), said end surface of the welding head having a protruding outer edge portion and a sloping surface portion contiguously provided adjacent said outer edge portion;

placing said ultrasonic welding head (6) with said outer edge portion thereof disposed in opposition to and along said first edge of the opening (16) and with said sloping surface portion thereof disposed inwardly of said first edge;

placing said work support block (7) with said flat work support surface thereof disposed in a face-to-face relation with a portion of said second sheet (2b) along said second edge of the opening;

moving said welding head (6) and said work support block (7) toward each other to bring the welding head and the work support block into contact with the first and second sheets, respectively;

generating ultrasonic waves from said welding head (6) to said work support block (7) through said first sheet (2a), said ribs (4) and said second sheet (2b) to said work support block (7) to generate internal frictional heat by ultrasonic vibration so as to melt the first sheet, the ribs and the second sheet in portions thereof in which ultrasonic waves are generated;

compressing the first and second sheets between the end surface of said welding head (6) and the flat work support surface of said work support block with said protruding outer edge portion of the welding head abutting against said first edge of the opening;

causing said protruding outer edge portion of the welding head to move the first edge of the opening toward and against the second edge of the opening;

causing said sloping surface portion of the welding head to move a region of the first sheet adjacent said first edge toward a region of the second sheet adjacent said second edge, to thereby shape said region of the first sheet to conform in shape to the sloping surface portion;

concurrently causing said sloping surface portion of the welding head to shape portions of said ribs adjacent said first and second edges of the opening to conform in shape to the sloping surface portion, thereby joining the first and second edges of the opening to form a closed end seam of a converging cross-sectional shape along said edges.

17. The thermoplastic synthetic resin panel welding method according to claim 16, wherein said sloping surface portion of the welding head (6) has a concave curved shape so that said closed end seam is given a convex curved shape on the side of the first sheet (2a).

18. A thermoplastic synthetic resin panel welding method comprising the steps of:

preparing a hollow thermoplastic synthetic resin panel (B) having a first sheet (2a), a second sheet (2b) parallel to the first sheet, and ribs (4) interposed between the first and second sheets to integrally join the first and second sheets and extending in parallel in a first direction, said synthetic resin panel (B) having a recess (17) therethrough, said recess having a first edge of the first sheet and a second edge of the second sheet;

providing an ultrasonic welding machine with an ultrasonic welding head (6) and a work support block (7), said welding head (6) having an end surface and said work support block (7) having a flat work support surface cooperable with said end surface of the welding head (6), said end surface of the welding head having a protruding outer edge portion and a sloping surface portion contiguously provided adjacent said outer edge portion;

placing said ultrasonic welding head (6) with said outer edge portion thereof disposed in opposition to and along said first edge of the recess (17) and with said sloping surface portion thereof disposed inwardly of said first edge;

placing said work support block (7) with said flat work support surface thereof disposed in a face-to-face relation with a portion of said second sheet (2b) along said second edge of the opening;

moving said welding head (6) and said work support block (7) toward each other to bring the welding head and the work support block into contact with the first and second sheets, respectively;

generating ultrasonic waves from said welding head (6) to said work support block (7) through said first sheet (2a), said ribs (4) and said second sheet (2b) to said work support block (7) to generate internal frictional heat bad ultrasonic vibration so as to melt the first sheet, the ribs; and the second sheet in portions thereof in which ultrasonic waves are generated;

compressing the first and second sheets between the end surface of said welding head (6) and the flat work support surface of said work support block with said protruding outer edge portion of the welding head abutting against said first edge of the recess;

causing said protruding outer edge portion of the welding head to move the first edge of the recess toward and against the second edge of the recess;

causing said sloping surface portion of the welding head to move a region of the first sheet adjacent said first edge toward a region of the second sheet adjacent said second edge, to thereby shape said region of the first sheet to conform in shape to the sloping surface portion;

concurrently causing said sloping surface portion of the welding head to shape portions of said ribs adjacent said first and second edges of the recess to conform in shape to the sloping surface portion, thereby joining the first and second edges of the recess to form a closed end seam of a converging cross-sectional shape along said edges.

19. The thermoplastic synthetic resin panel welding method according to claim 18, wherein said sloping surface portion of the welding head (6) has a concave curved shape so that said closed end seam is given a convex curved shape on the side of the first sheet (2a).

* * * * *